United States Patent
Imai et al.

(10) Patent No.: US 8,194,095 B2
(45) Date of Patent: Jun. 5, 2012

(54) COLOR IMAGE DISPLAY DEVICE AND COLOR CONVERSION DEVICE

(75) Inventors: Takumi Imai, Chiba (JP); Kenichi Iwauchi, Matsudo (JP)

(73) Assignee: Sharp Kabushiki Kaisha, Osaka (JP)

( * ) Notice: Subject to any disclaimer, the term of this patent is extended or adjusted under 35 U.S.C. 154(b) by 824 days.

(21) Appl. No.: 12/295,707

(22) PCT Filed: Apr. 20, 2007

(86) PCT No.: PCT/JP2007/058614
§ 371 (c)(1),
(2), (4) Date: Oct. 1, 2008

(87) PCT Pub. No.: WO2007/132635
PCT Pub. Date: Nov. 22, 2007

(65) Prior Publication Data
US 2009/0278982 A1    Nov. 12, 2009

(30) Foreign Application Priority Data

May 15, 2006   (JP) ................................. 2006-135442

(51) Int. Cl.
*G09G 5/02* (2006.01)
(52) U.S. Cl. ......................................... 345/590; 345/604
(58) Field of Classification Search .................. 345/590; 348/453; 358/520
See application file for complete search history.

(56) References Cited

U.S. PATENT DOCUMENTS

| | | | |
|---|---|---|---|
| 5,539,540 A | 7/1996 | Spaulding et al. | |
| 5,734,745 A | 3/1998 | Ohneda | |
| 5,903,275 A | 5/1999 | Guay | |
| 5,933,252 A | 8/1999 | Emori et al. | |
| 6,144,352 A | 11/2000 | Matsuda et al. | |
| 6,486,923 B1 | 11/2002 | Maeshima et al. | |

(Continued)

FOREIGN PATENT DOCUMENTS

EP   1195983 A2   4/2002

(Continued)

OTHER PUBLICATIONS

Kang et al., "Methods of Colour Gamut Extension Algorithm Development Using Experimental Data," IEEE Tencon, Sep. 15, 1999, pp. 352-355, XP010368297.

*Primary Examiner* — Ulka Chauhan
*Assistant Examiner* — Kyle Zhai
(74) *Attorney, Agent, or Firm* — Birch, Stewart, Kolasch & Birch, LLP

(57) ABSTRACT

A color image display device is provided to reproduce colors determined by an input video signal in a color space of the display device while keeping a wide color reproducing region of the display device with natural hues. On the assumption that a color space is hypothetically considered so that an input signal is originally in hue in a first color range while an increasing saturation is reproduced with hues changed gradually to a widening direction of color reproduction in a second color range or more, the color converting portion 12 converts a video signal, so that an input video signal 10 is reproduced on a color image displaying portion 13 with a tristimulus value represented in this hypothetical color space, and the color image displaying portion 13 displays, and reproduces, a vivid video image without a feeling of wrongness by making use of a wide color reproduction range of the color image display device.

20 Claims, 14 Drawing Sheets

U.S. PATENT DOCUMENTS

| | | | |
|---|---|---|---|
| 7,177,465 B1 * | 2/2007 | Takahira | 382/166 |
| 7,408,558 B2 * | 8/2008 | Madden et al. | 345/590 |
| 2001/0045918 A1 | 11/2001 | Ushigusa et al. | |
| 2002/0015043 A1 | 2/2002 | Matsuda | |
| 2003/0072015 A1 * | 4/2003 | Fujino | 358/1.9 |
| 2004/0051888 A1 | 3/2004 | Zolliker | |
| 2006/0139368 A1 | 6/2006 | Kinoshita et al. | |

FOREIGN PATENT DOCUMENTS

| | | |
|---|---|---|
| EP | 1370070 A1 | 12/2003 |
| JP | 6-225130 A | 8/1994 |
| JP | 7-95427 A | 4/1995 |
| JP | 8-69518 A | 3/1996 |
| JP | 10-319911 A | 12/1998 |
| JP | 2000-278705 A | 10/2000 |
| JP | 2001-36757 A | 2/2001 |
| JP | 2002-125125 A | 4/2002 |
| JP | 2005-91610 A | 4/2005 |
| JP | 2005-184117 A | 7/2005 |
| JP | 2005-315938 A | 11/2005 |
| JP | 2005-341500 A | 12/2005 |
| WO | WO 2004/068845 A1 | 8/2004 |
| WO | WO 2004/070699 A1 | 8/2004 |

* cited by examiner

COLOR IMAGE DISPLAY DEVICE AND COLOR CONVERSION DEVICE

TECHNICAL FIELD

The present invention relates to a color image display device and a color conversion device, and, more particularly, to a color image display device and a color conversion device performing color conversion of video signals.

BACKGROUND OF THE INVENTION

Recently, from a viewpoint of environment issues such as mercury-less, and for realizing a long-lived device, semiconductor light sources such as LED (light emitting diode) and laser are actively used as light sources for color image display devices. Major advantages of using semiconductor light sources include that displays with wide color reproduction ranges may be realized. This is because semiconductor light sources have sharp spectrums, and color image display devices using semiconductor light sources for three primary colors of red, green, and blue may have wider color reproduction ranges as compared to conventional color image display devices such as CRT (cathode ray tube) displays and liquid crystal displays using cold cathode fluorescent lamps. However, since saturation is increased in overall display due to the wider color reproduction ranges, colors are unnaturally reproduced such as a light blue sky is turned to be a deep blue sky or human skin to be yellow.

Since hues of red, green, and blue of semiconductor light sources are different from hues of the primary colors intended in input video signals, if the signals are directly displayed by color image display devices using semiconductor light sources for their light sources, reproduced videos have unnatural hues. For example, colors are unnaturally reproduced such as grass is displayed in bluish green since the green of semiconductor light source is bluish green having a shorter wave length and human skin is turned to be reddish since the red of semiconductor light source is crimson red having a longer wave length. To solve differences in hues in semiconductor light sources, for example, a color management technology of Patent Document 1 has been proposed.

In the invention described in Patent Document 1, in a color image display device having three primary colors with hues different from desired hues, an RGB video signal [R, G, B] is decomposed into three matrices of respective primary-color components as follows.

$$\begin{pmatrix} R \\ G \\ B \end{pmatrix} = \begin{pmatrix} R \\ 0 \\ 0 \end{pmatrix} + \begin{pmatrix} 0 \\ G \\ 0 \end{pmatrix} + \begin{pmatrix} 0 \\ 0 \\ B \end{pmatrix}$$ [Expression 1]

The decomposed components are converted with the use of constants a to i as follows.

$$\begin{pmatrix} R \\ 0 \\ 0 \end{pmatrix} \Rightarrow \begin{pmatrix} a \times R \\ d \times R \\ g \times R \end{pmatrix}$$ [Expression 2]

$$\begin{pmatrix} 0 \\ G \\ 0 \end{pmatrix} \Rightarrow \begin{pmatrix} b \times G \\ e \times G \\ h \times G \end{pmatrix}$$

-continued $$\begin{pmatrix} 0 \\ 0 \\ B \end{pmatrix} \Rightarrow \begin{pmatrix} c \times B \\ f \times B \\ i \times B \end{pmatrix}$$

The respective matrixes are summed to synthesize a converted RGB video signal [R', G', B']

$$\begin{pmatrix} R' \\ G' \\ B' \end{pmatrix} = \begin{pmatrix} a \times R \\ d \times R \\ g \times R \end{pmatrix} + \begin{pmatrix} b \times G \\ e \times G \\ h \times G \end{pmatrix} + \begin{pmatrix} c \times B \\ f \times B \\ i \times B \end{pmatrix}$$ [Expression 3]

$$= \begin{pmatrix} a \times R + b \times G + c \times B \\ d \times R + e \times G + f \times B \\ g \times R + h \times G + i \times B \end{pmatrix}$$

$$= \begin{pmatrix} a & b & c \\ d & e & f \\ g & h & i \end{pmatrix} \begin{pmatrix} R \\ G \\ B \end{pmatrix}$$

This means that when red is displayed, a hue of the red to be displayed is changed by emitting light for not only red but also green and blue at a certain rate to acquire a desired hue.

FIG. 14 is a chromaticity diagram of conversion of color space using a conventional color conversion device. This is the u'v' chromaticity diagram (CIE1976UCS chromaticity diagram) and, in this example, a method described in above Patent Document 1 is used to correct a hue in accordance with the sRGB standard color space established in IEC61933-2-1. It is well known that colors of two points on the half line drawn from a white chromaticity coordinate 000 toward a chromaticity coordinate of arbitrary color have the same hues and distances from the white chromaticity coordinate 000 generally correspond to saturations of the points.

Since chromaticity coordinates of the three primary colors of a color reproduction range 010 of the color image display device are not located on the half lines linking the white chromaticity coordinate 000 and the chromaticity coordinates of the three primary colors of the sRGB standard color space (color reproduction range of a video signal) 020, the hues are different from those of the primary colors of the sRGB standard color space 020. The video signal may be converted using the method disclosed in Patent Document 1 and reproduced as a color reproduction range 030. Since the chromaticity coordinates of the three primary colors of the color reproduction range 030 are shifted onto the half lines linking the white chromaticity coordinate 000 and the chromaticity coordinates of the three primary colors of the sRGB standard color space 020, the converted hues of the three primary colors become identical to the hues of the primary colors of the sRGB standard color space 020.

Patent Document 1: Japanese Laid-Open Patent Publication No. 2000-278705

DISCLOSURE OF THE INVENTION

Problem to be Solved by the Invention

However, since hues are made identical by narrowing a color reproduction range of a color image display device as shown in FIG. 14 in the method described in Patent Document 1, even when a color image display device with wide color reproduction range is used, only a portion of the color reproduction range is utilized but not a range of high color purity in the color reproduction range of the color image display device. That is, it was impossible to fulfill both requirements of at the same time utilizing the color reproduction range of the color image display device extensively to a range having higher color purity and of retaining hues.

The present invention was conceived in view of the above problem and it is therefore the object of the present invention to provide a color image display device and a color conversion device which reproduces colors determined from input video signals in a color space of a display device in realizing natural hues and making good use of a wide color reproduction range of the display device.

Means for Solving the Problem

In order to solve the above problem, a first technical means of the present invention is a color image display device using at least three primary colors to display an image, color ranges displayed in the color image display device include at least two color ranges of a first color range including white and a second color range having saturation higher than the first color range, and a color with saturation higher than saturation determined by an input video signal is displayed with a hue determined by the input video signal in the first color range, while a color with a hue different from the hue determined by the input video signal is displayed in the second color range.

A second technical means is the color image display device, wherein in the second color range, a color is displayed that is closer to a hue of a primary color of the color image display device as compared to the hue determined by the input video signal.

A third technical means is the color image display device, wherein the color ranges displayed by the color image display device further include a third color range having saturation higher than the second color range, and a color having a hue different from the hue determined by the input video signal but more closer to the hue of the primary color of the color image display device as compared to the color displayed in the second color range is displayed in the third color range.

A fourth technical means is the color image display device, wherein a color with saturation higher than the saturation determined by the input video signal is displayed in the second color range, and a degree of enhancement of the saturation is different from a degree of enhancement of the saturation in the first color range.

A fifth technical means is the color image display device, wherein the color ranges displayed by the color image display device further include a fourth color range having saturation higher than the second color range, and a color with saturation higher than the saturation determined by the input video signal is displayed with the hue determined by the input video signal in the fourth color range, and the degree of enhancement of the saturation is greater than the degree of enhancement of the saturation in the first color range and is different from the degree of enhancement of the saturation in the second color range.

A sixth technical means is a color conversion device which converts an input video signal using at least three primary colors into an output video signal suitable for a specific color image display device which reproduces color ranges including at least two color ranges of a first color range including white and a second color range having saturation higher than the first color range, and the color conversion device converts the input video signal into an output video signal which displays a color with saturation higher than saturation determined by an input video signal with a hue determined by the input video signal in the first color range and displays a color with a hue different from the hue determined by the input video signal in the second color range.

A seventh technical means is the color conversion device which converts the input video signal in the second color range into the output video signal that displays a color having a closer hue to the hue of a primary color of the color image display device as compared to the hue determined by the input video signal.

An eighth technical means is the color conversion device, wherein the color ranges displayed by the color image display device further include a third color range having saturation higher than the second color range, and the color conversion device converts the input video signal into the output video signal which displays a color different from the hue determined by the input video signal in the third color range and more closer to the hue of the primary color of the color image display device as compared to the color displayed in the second color range.

A ninth technical means is the color conversion device, wherein a color with saturation higher than the saturation determined by the input video signal is displayed in the second color range, and a degree of enhancement of the saturation is different from a degree of enhancement of the saturation in the first color range.

A tenth technical means is the color conversion device, wherein the color ranges displayed by the color image display device further include a fourth color range having saturation higher than the second color range, and a color with saturation higher than the saturation determined by the input video signal is displayed with the hue determined by the input video signal in the fourth color range, and a degree of enhancement of the saturation is greater than the degree of enhancement of the saturation in the first color range and is different from the degree of enhancement of the saturation in the second color range.

Effect of the Invention

According to the present invention, since a color is reproduced with an original hue of an input video signal in the first color range and a color is reproduced with enhanced saturation while changing a hue gradually to extend a color reproduction range, a vivid video can be reproduced without giving uncomfortable feeling by making good use of a wide color reproduction range of a display device.

EXPLANATIONS OF REFERENCE NUMERALS

10 . . . input video signal; 11 . . . color image display device; 12 . . . color converting portion; 12a . . . gamma converting portion; 12b . . . video signal converting portion; 12c . . . degamma conversion portion; 13 . . . color image displaying portion; 20 . . . red LED; 21 . . . green LED; 22 . . . blue LED; 23 . . . mirror; 24 . . . green-reflection/blue-transmission dichroic mirror; 25 . . . blue-green-reflection/red-transmission dichroic mirror; 26 . . . condenser lens; 27 . . . mirror; 28 . . . spatial light modulator; 29 . . . projection lens; and 30 . . . screen.

PREFERRED EMBODIMENTS OF THE INVENTION

Preferred embodiments of a color image display device and a color conversion device according to the present invention will hereinafter be described with reference to the accompanying drawings.

First Embodiment

Figure 1:
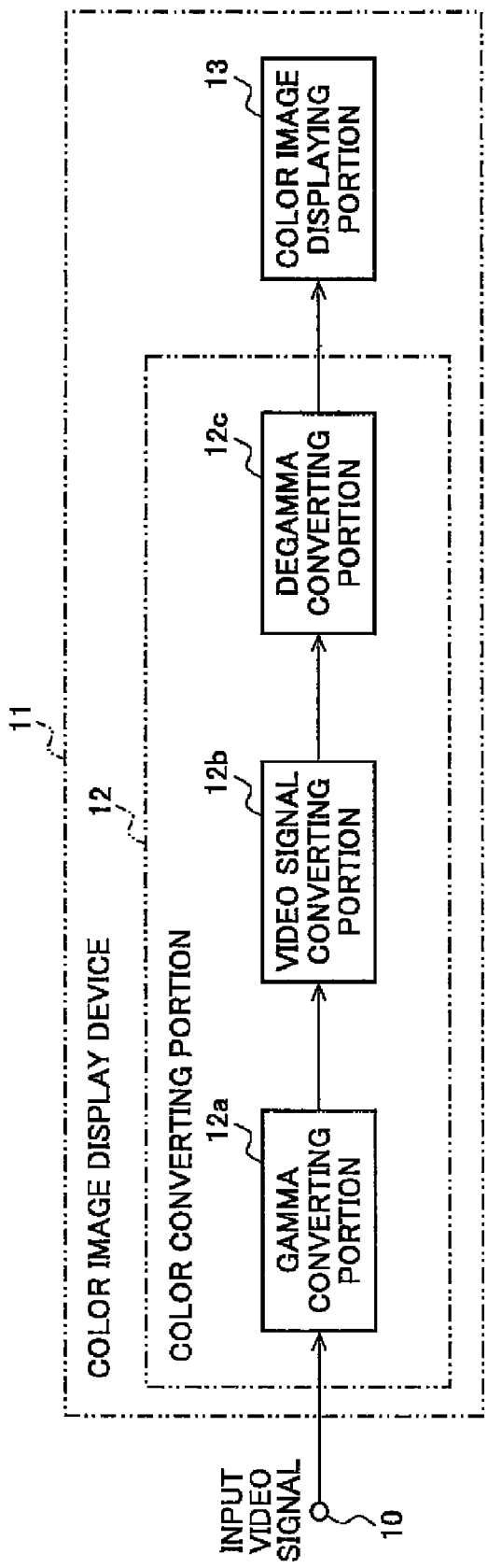
FIG. 1 is a block diagram of an exemplary configuration of a color image display device according to a first embodiment of the present invention.

FIG. 1 is a block diagram of an exemplary configuration of a display device according to a first embodiment of the present invention; in FIG. 1, a reference numeral 10 denotes an input video signal; 11 denotes a color image display device; 12 denotes a color converting portion; and 13 denotes a color image displaying portion. The input video signal 10 is color-converted by the color converting portion 12 and displayed by the color image displaying portion 13.

The color converting portion 12 corresponds to a color conversion device of the present invention, and includes a gamma converting portion 12a that performs gamma conversion for the input video signal 10, a video signal converting portion 12b that performs a converting processing of a gamma-converted RGB signal, and a degamma conversion portion 12c that performs degamma conversion using the inverse function of gamma characteristics of the color image displaying portion 13. These portions will be described in detail later.

Figure 2:
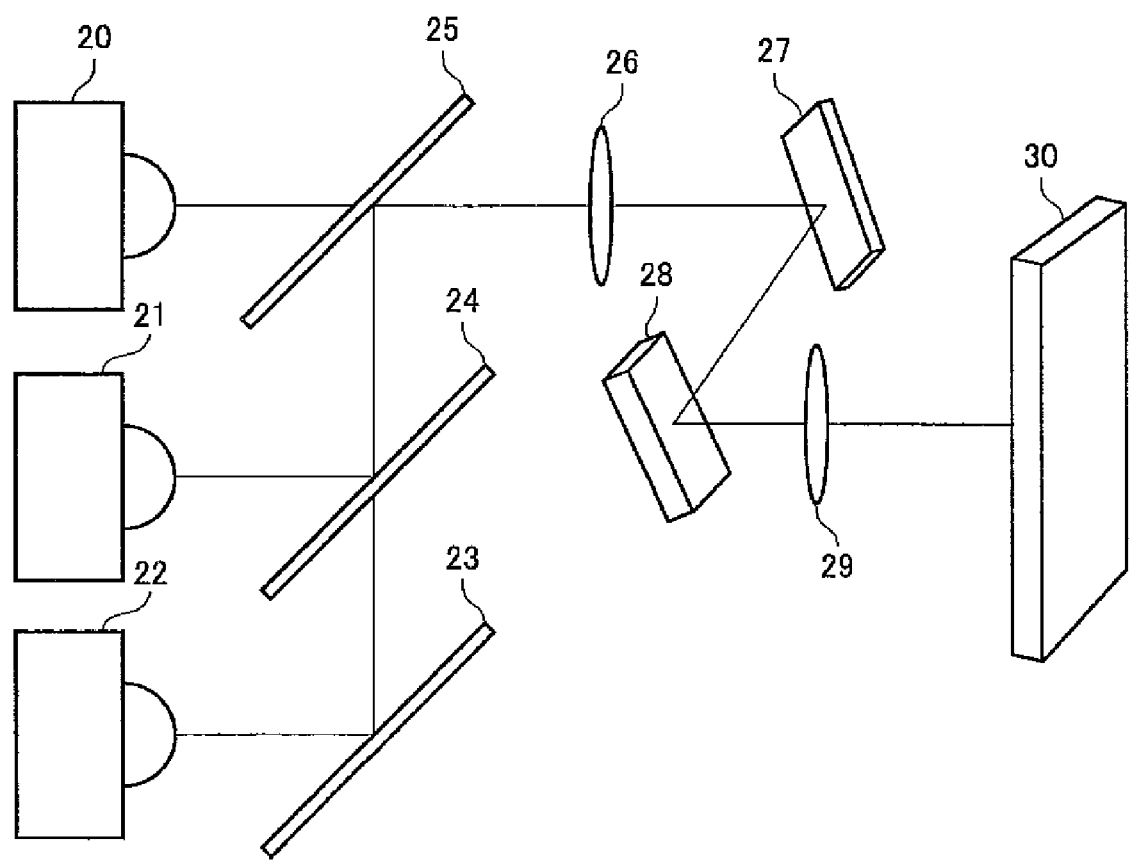
FIG. 2 is a view of an exemplary configuration of a color image displaying portion according to the first embodiment of the present invention.

FIG. 2 is a view of an exemplary configuration of the color image displaying portion 13 according to the first embodiment of the present invention. A DLP (Digital Light Processing, registered trademark) projector using LED (light emitting diode) as a light source is shown as an example of the color image displaying portion 13 used in this embodiment.

In FIG. 2, lights from a red LED 20, a green LED 21, and a blue LED 22 are combined with the use of a mirror 23, a green-reflection/blue-transmission dichroic mirror 24, and a blue-green-reflection/red-transmission dichroic mirror 25, condensed by the lens 26, and then arrive at a spatial light modulator 28 through mirror 27. If the spatial light modulator 28 is composed by a plate, i.e., in the case of a so-called single plate, the light from LED is time-shared, and the spatial light modulator 28 performs the spatial light modulation of pixels in accordance with periods of emission of red/green/blue to reflect the light to the projection lens 29 with time-average light intensity becoming to a value corresponding to the input video signal of the pixels. The light passes through the projection lens 29 and forms an image on the screen 30.

The input video signal 10 shown in FIG. 1 is a standard RGB signal having a color in the sRGB standard color space decomposed into standard primary color components of red/green/blue with the chromaticity coordinates shown in the following Table 1, which are represented by numeric values of the red/green/blue components.

Figure 3:
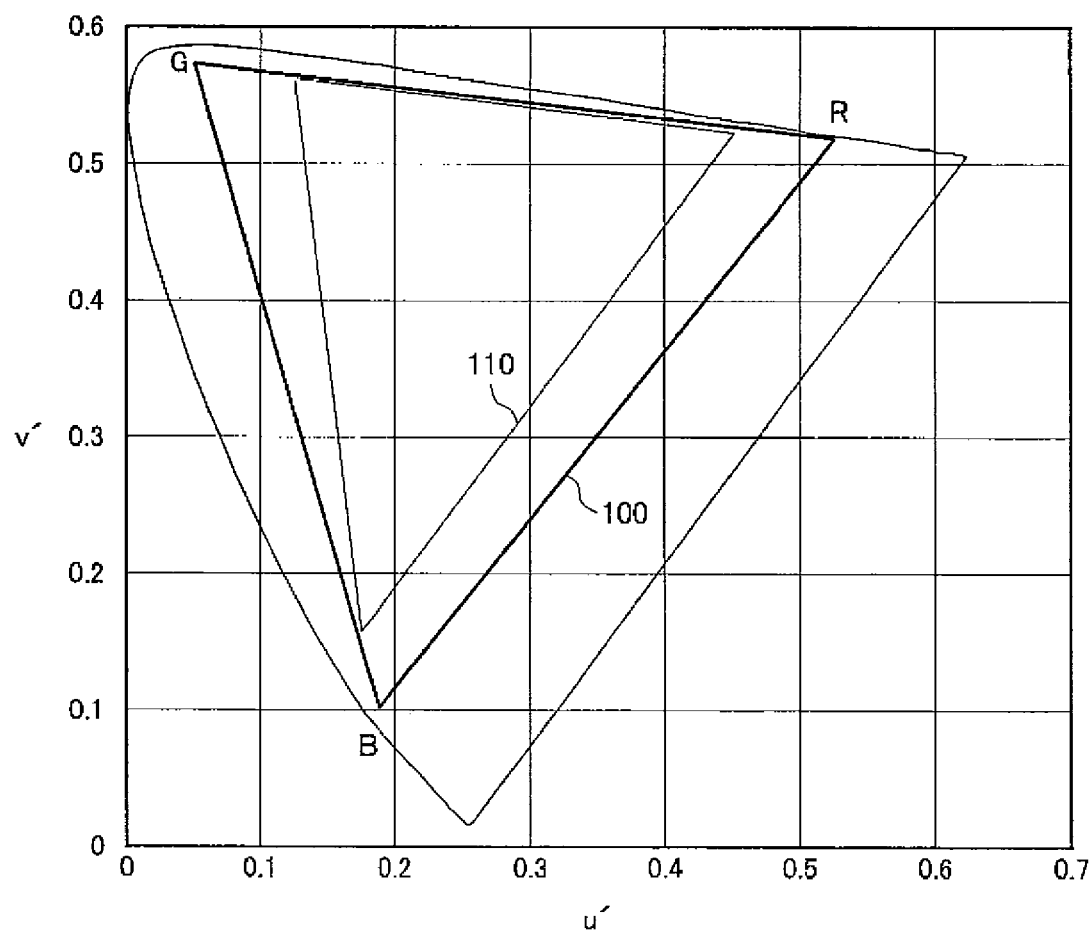
FIG. 3 is a chromaticity diagram of a color reproduction range of the color image displaying portion and a color reproduction range of a video signal, according to the first embodiment of the present invention.

FIG. 3 is a chromaticity diagram of a color reproduction range of the color image display device and a color reproduction range of a video signal, according to the first embodiment of the present invention. This is the u'v' chromaticity diagram (CIE1976UCS chromaticity diagram) and shows a color reproduction range 100 of the color image displaying portion 13 and a color reproduction range 110, which is the sRGB standard color space projected onto the u'v' chromaticity diagram.

TABLE 1

|   | Red | Green | Blue | White (D65) |
|---|---|---|---|---|
| x | 0.6400 | 0.3000 | 0.1500 | 0.3127 |
| y | 0.3300 | 0.6000 | 0.0600 | 0.3290 |

Relationship between chromaticity coordinates and tristimulus values will be described. Values x and y of Table 1 is coordinates on the xy chromaticity diagram (CIE1931 chromaticity diagram) and have the following relationship with tristimulus values X, Y, and Z of the CIE1931 XYZ color space.

[Expression 4]

$x = X/(X+Y+Z)$ $y = Y/(X+Y+Z)$   Eq. (1)

The following relationship is established between chromaticity coordinates u' and v' on the u'v' chromaticity diagram (CIE1976UCS chromaticity diagram) and the tristimulus values X, Y, and Z of the CIE1931 XYZ color space.

[Expression 5]

$u' = 4X/(X+15Y+3Z)$ $v' = 9Y/(X+15Y+3Z)$   Eq. (2)

Therefore, from Eq. 1 and Eq. 2, the u'v' chromaticity coordinates may easily be calculated for the standard primary colors and white of the sRGB standard color space from Eq. 1 and Eq. 2. The following relationship is established between RGB values of a standard RGB signal and the tristimulus values of the CIE1931 XYZ color space. However, the RGB values must be multiplied by 100/255 such that the RGB signal values of Eq. 3 and Eq. 4 can fall within a range of 0-100 instead of 0-255.

[Expression 6]

$$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R_{sRGB} \\ G_{sRGB} \\ B_{sRGB} \end{pmatrix} \quad \text{Eq. (3)}$$

$$\begin{pmatrix} R_{sRGB} \\ G_{sRGB} \\ B_{sRGB} \end{pmatrix} = \begin{pmatrix} 3.2406 & -1.5372 & -0.4986 \\ -0.9689 & 1.8758 & 0.0415 \\ 0.0557 & -0.2040 & 1.0570 \end{pmatrix} \begin{pmatrix} X \\ Y \\ Z \end{pmatrix} \quad \text{Eq. (4)}$$

A first color space is defined as a space determined by an input video signal and representing entire color that can be represented by the input video signal. For example, the first color space possessed by the input video signal 10 is the sRGB standard color space and may represent color within the color reproduction range 110 in the u'v' chromaticity diagram shown in FIG. 3. A second color space is defined as a color space reproducible by the color image displaying portion 13. For example, the second color space of the color image displaying portion 13 has the color reproduction range 100 in the u'v' chromaticity diagram shown in FIG. 3.

Figure 4:
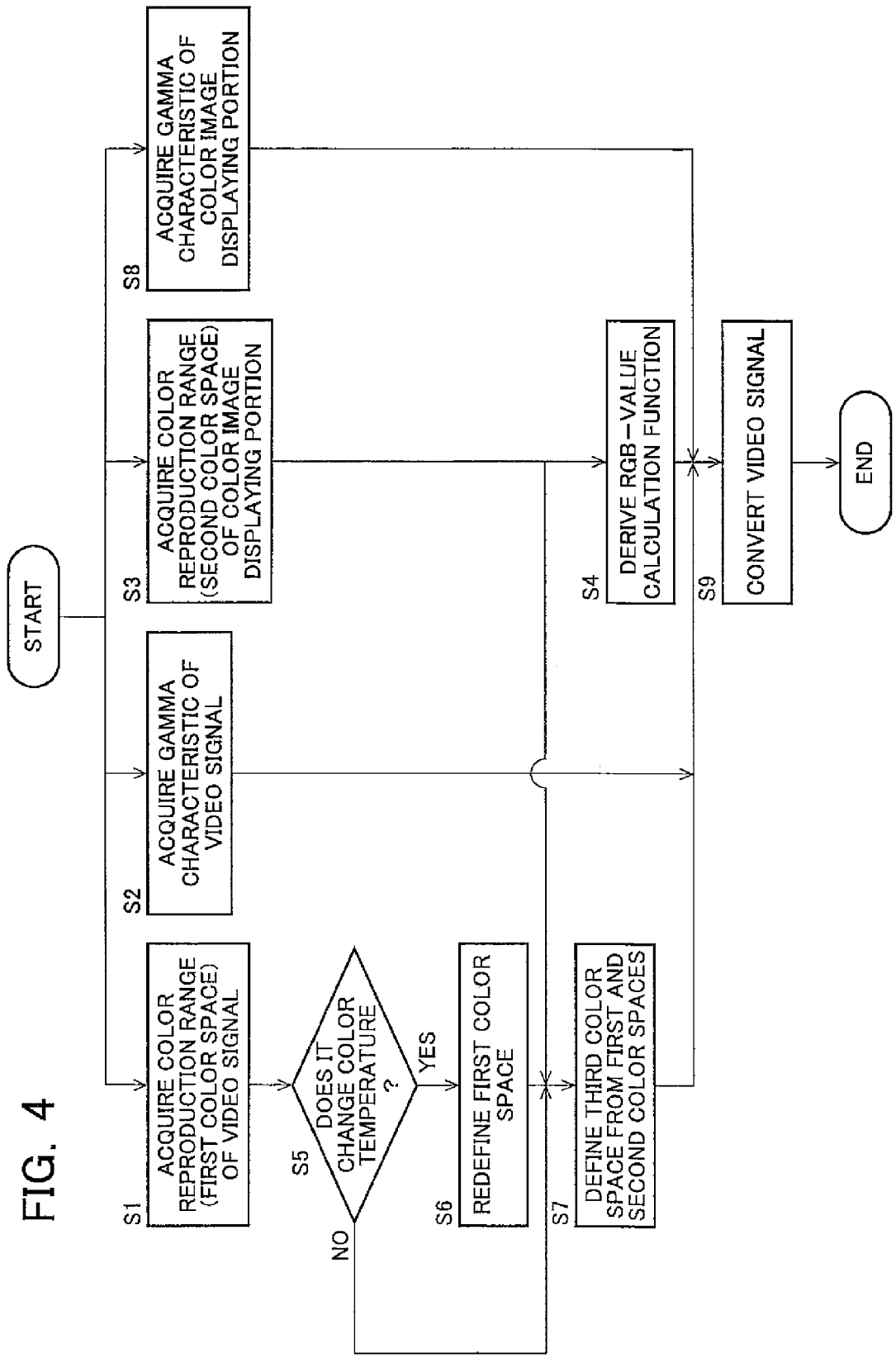
FIG. 4 is a flow diagram for explaining an example of a color conversion parameter calculating processing in a color converting portion according to the first embodiment of the present invention.

FIG. 4 is a flow diagram for explaining an example of a color conversion procedure in the color converting portion 12 according to the first embodiment of the present invention. First, a color reproduction range of a video signal is acquired (step S1) Since all the colors represented by the video signal are represented by adding the standard primary colors of red/green/blue, the color reproduction range of the video signal is identified by a three-by-three matrix consisting of tristimulus values X, Y, and Z corresponding to the video signals representing the standard primary colors of red/green/blue. Since the video signals in this embodiment correspond to the sRGB standard color space, the tristimulus values X, Y, and Z of the CIE1931 XYZ color space can be calculated from Table 1 and Eq. 1. In stead of executing calculation, the color converting portion 12 can perform a color conversion by referring to the predetermined information of a color reproduction range corresponding to a type of video signal. The gamma characteristic of the video signal is acquired (step S2).

Subsequently, a color reproduction range of the color image displaying portion 13 and a transfer function of the color image displaying portion 13 are acquired (step S3). Tristimulus values X, Y, and Z of the color image displaying portion 13 are measured for RGB signals [255,0,0], [0,255,0], [0,0,255], which correspond to the standard primary colors of the RGB standard signal, and [0,0,0], which corresponds to black.

Matrixes representing the tristimulus values of the signals are defined as $R_0$, $G_0$, $B_0$, and $K_0$ as shown in Eq. 5 described below. Since the tristimulus value $K_0$ measured for the video signal [0,0,0] is a noise component like external light equally added all the input video signals, the tristimulus value $K_0$ is subtracted from the measured values as shown in Eq. 6. If a value of $K_0$ is sufficiently smaller than $R_0$, $G_0$, and $B_0$, subtraction of $K_0$ may be omitted for simplicity.

[Expression 7]

$$R_0 = \begin{pmatrix} X_r \\ Y_r \\ Z_r \end{pmatrix} G_0 = \begin{pmatrix} X_g \\ Y_g \\ Z_g \end{pmatrix} B_0 = \begin{pmatrix} X_b \\ Y_b \\ Z_b \end{pmatrix} K_0 = \begin{pmatrix} X_k \\ Y_k \\ Z_k \end{pmatrix} \quad \text{Eq. (5)}$$

$$R'_0 = R_0 - K_0 = \begin{pmatrix} X_r - X_k \\ Y_r - Y_k \\ Z_r - Z_k \end{pmatrix} \quad \text{Eq. (6)}$$

$$G'_0 = G_0 - K_0 = \begin{pmatrix} X_g - X_k \\ Y_g - Y_k \\ Z_g - Z_k \end{pmatrix}$$

$$B'_0 = B_0 - K_0 = \begin{pmatrix} X_b - X_k \\ Y_b - Y_k \\ Z_b - Z_k \end{pmatrix}$$

As above, matrixes $R'_0$, $G'_0$, and $B'_0$ of the tristimulus value of colors displayed in the color image displaying portion are acquired for the standard RGB signal representing the standard primary colors of red/green/blue. The second color space of the color image displaying portion 13 of the present invention is a range obtained by adding $K_0$ to the tristimulus values available when the matrixes $R'_0$, $G'_0$, and $B'_0$ are multiplied by a real number within a range of 0 to 1 and summed. The input video signal of the color image displaying portion of the present invention may uniquely be linked with a color displayed on the color image displaying portion 13 by a transfer function T.

The transfer function T is obtained from a matrix operation of an inverse matrix of a three-by-three matrix having values of the standard RGB signals corresponding to the primary colors of red/green/blue and a three-by-three matrix having values obtained by subtracting measured color values at the time of inputting the RGB signal corresponding to black from measured color values at the time of inputting the above RGB signals, as shown in Eq. 7 described below. Using the obtained transfer function T enables calculation of a tristimulus value $[X_i, Y_i, Z_i]$ of color displayed on the color image displaying portion 13 when an arbitrary standard RGB signal $[R_i, G_i, B_i]$ is input as shown in Eq. (8).

[Expression 8]

$$T = \begin{pmatrix} X_r - X_k & X_g - X_k & X_b - X_k \\ Y_r - Y_k & Y_g - Y_k & Y_b - Y_k \\ Z_r - Z_k & Z_g - Z_k & Z_b - Z_k \end{pmatrix} \begin{pmatrix} 255 & 0 & 0 \\ 0 & 255 & 0 \\ 0 & 0 & 255 \end{pmatrix}^{-1} \quad \text{Eq. (7)}$$

$$= \frac{1}{255} \cdot \begin{pmatrix} X_r - X_k & X_g - X_k & X_b - X_k \\ Y_r - Y_k & Y_g - Y_k & Y_b - Y_k \\ Z_r - Z_k & Z_g - Z_k & Z_b - Z_k \end{pmatrix}$$

$$\begin{pmatrix} X_i \\ Y_i \\ Z_i \end{pmatrix} = T \begin{pmatrix} R_i \\ G_i \\ B_i \end{pmatrix} + \begin{pmatrix} X_k \\ Y_k \\ Z_k \end{pmatrix} \quad \text{Eq. (8)}$$

An inverse relation of this transfer function (RGB-value calculating function S) is then obtained (step S4). Eq. 8 may be transformed into Eq. 9.

When components of a matrix $T^{-1}$ are arranged as shown in Eq. 10, Eq. 9 may be rewritten as Eq. 11, and it can be known that an RGB signal value to be input to the color image displaying portion 13 can be calculated by multiplying a tristimulus value desired to be displayed by a matrix having four lines and three columns. The RGB-value calculating function S is a matrix for obtaining an RGB signal value from this tristimulus value.

[Expression 9]

$$\begin{pmatrix} R_i \\ G_i \\ B_i \end{pmatrix} = T^{-1} \begin{pmatrix} X_i - X_k \\ Y_i - Y_k \\ Z_i - Z_k \end{pmatrix} \quad \text{Eq. (9)}$$

$$T^{-1} = \begin{pmatrix} t_{11} & t_{21} & t_{31} \\ t_{12} & t_{22} & t_{32} \\ t_{13} & t_{23} & t_{33} \end{pmatrix} \quad \text{Eq. (10)}$$

$$\begin{pmatrix} R_i \\ G_i \\ B_i \end{pmatrix} = \cdot \begin{pmatrix} t_{11} & t_{21} & t_{31} & -(t_{11}+t_{12}+t_{13}) \cdot X_k \\ t_{12} & t_{22} & t_{32} & -(t_{21}+t_{22}+t_{23}) \cdot Y_k \\ t_{13} & t_{23} & t_{33} & -(t_{31}+t_{32}+t_{33}) \cdot Z_k \end{pmatrix} \begin{pmatrix} X_i \\ Y_i \\ Z_i \\ 1 \end{pmatrix} \quad \text{Eq. (11)}$$

$$\begin{pmatrix} R_i \\ G_i \\ B_i \end{pmatrix} = S \begin{pmatrix} X_i \\ Y_i \\ Z_i \\ 1 \end{pmatrix} \quad \text{Eq. (12)}$$

The RGB-value calculating function S shown in Eq. 12 may be calculated from Eq. 13 ignoring effects of a noise component on the left side of Eq. 8 for simplifying operation or may be calculated from Eq. 14 expanded to ten lines and three columns by adding quadratic terms for enhancing the accuracy. If the input/output characteristics of the display device are considerably nonlinear, a lookup table (LUT) corresponding to actual input/output characteristics may be used as the RGB-value calculating function to further enhance the accuracy. The LUT is preliminarily obtained and tabulated outputs pairing with inputs.

[Expression 10]

$$\begin{pmatrix} X_i \\ Y_i \\ Z_i \end{pmatrix} = T \begin{pmatrix} R_i \\ G_i \\ B_i \end{pmatrix} \quad \text{Eq. (13)}$$

$$\begin{pmatrix} X_i \\ Y_i \\ Z_i \end{pmatrix} = T \begin{pmatrix} R_i \\ G_i \\ B_i \\ R_i^2 \\ G_i^2 \\ B_i^2 \\ R_i \cdot G_i \\ G_i \cdot B_i \\ B_i \cdot R_i \\ 1 \end{pmatrix} \quad \text{Eq. (14)}$$

The RGB values used for obtaining the tristimulus values must be values having a linear relation with actual luminance. Since the degamma conversion is performed for the video signal in accordance with the characteristics of CRT, the standard RGB signal must be subjected to gamma conversion based on the gamma characteristic of the previously acquired video signal. The gamma conversion of this embodiment is performed based on ITU-R BT.709 as follows.

$$R'_{signal} = R_{signal}/255 \quad R'_{value} = R_{value}/255$$

$$G'_{signal} = G_{signal}/255 \quad G'_{value} = G_{value}/255$$

$$B'_{signal} = B_{signal}/255 \quad B'_{value} = B_{value}/255 \quad \text{[Expression 11]}$$

In the above case, when $R'_{signal}, G'_{signal}, B'_{signal} \leq 0.04045$ $$R'_{value} = R'_{signal}/12.92$$

$$G'_{value} = G'_{signal}/12.92$$

$$B'_{value} = B'_{signal}/12.92 \quad \text{[Expression 12]}$$

when $R'_{signal}, G'_{signal}, B'_{signal} > 0.04045$ $$R'_{value} = [(R'_{signal}+0.055)/1.055]^{2.4}$$

$$G'_{value} = [(G'_{signal}+0.055)/1.055]^{2.4} \quad \text{[Expression 13]}$$

$$B'_{value} = [(B'_{signal}+0.055)/1.055]^{2.4}$$

The RGB signal values $R'_{signal}$, $G'_{signal}$, and $B'_{signal}$ of the input video signal may be turned to the true values $R'_{value}$, $G'_{value}$, and $B'_{value}$ having a linear relation with luminance displayed on a standard display as above.

Although the input video signals are measured in this case, if the coordinates of the primary colors and the white coordinate of the color image displaying portion 13 are known, X, Y, and Z may be obtained by the inverse operations from the chromaticity coordinates without the measurement.

If it (the color converting portion 12) does not change color temperature (in the case of NO at step S5), a third color space is newly defined from the first color space and the second color space (step S7). Although the color converting portion 12 of the embodiment converts the video signal such that a desired color is reproduced on the color image displaying portion 13, what is attempted to be reproduced through the conversion is a color obtained by converting the color of the first color space into the third color space rather than the color of the first color space itself represented by the input video signal. Therefore, how the video is reproduced with the video converted by the color converting portion 12 depends on how a relation between the first color space and the third color space is defined. The conversion from the first color space to the third color space is performed after dividing the first color space into a plurality of color ranges, and the first color space and the third color space have different relations in the respective color range. Among the color ranges, a color range including white is referred to as a first-color-space first color range before the conversion and as a third-color-space first color range after the conversion. One of the color ranges which is located outside the first-color-space first color range and includes a color having the same hue as that of at least one of the primary colors of the first color space is referred to as a first-color-space second color range. The color of the first-color-space second color range is converted to a third-color-space second color range.

When the third color space is defined, first, the tristimulus values of white of the first color space are obtained. Although a defined value may be used in the case of the sRGB standard with which the input video signal of the embodiment complies since the tristimulus values of white have been defined, if the white coordinate desired to be reproduced in the third color space is different from the white coordinate of the first color space, that is, for example, in a case that video with different color temperature is desired to be reproduced by the display device (in the case of YES at step S5), the first color space is preliminarily redefined (step S6). If a value of Y representing luminance is defined as 100 among the tristimulus values at the white coordinate, the tristimulus values of red/green/blue corresponding to the white coordinate different from that of the original first color space may be acquired through calculations since the chromaticity coordinates of red/green/blue of the first color space are already known.

It is possible to refer to a table of tristimulus values which is obtained in advance through calculations for representative white color temperature. If it changes color temperature, the coordinates of the primary colors of red/green/blue may be redefined along with the white coordinate in consideration of the adaptive effect of the visual function. If the redefinition is performed, the first color space is newly defined as a color space defined by the redefined coordinates of the primary colors of red/green/blue and the white coordinate.

Based on the coordinates of red/green/blue and white of the first color space, the third-color-space first color range is defined by expanding the first color space, i.e., enhancing the saturation, while retaining the hue. In this description, when a hue is considered with the use of a chromaticity diagram that is a two-dimensional plane, if a half line is extended from the reference white coordinate to a coordinate of a color A and the color A is converted into another color on this half line, it is assumed that the hue is retained. When a hue is considered in a uniform color space that is a three-dimensional space, the hue is assumed to be retained when the color A is converted into a color on the plane which is horizontal to the luminance (brightness) axis and includes the half line that is drawn from the reference white coordinate to a coordinate of a color A.

The third color space is defined on a chromaticity diagram in this embodiment. If the chromaticity coordinates of the new primary colors are defined on the halt lines extended from the white coordinate of the first color space to the chromaticity coordinates of the primary colors of the first color space on the chromaticity diagram, the saturation may be enhanced with the overall hue retained. However, although this simply assures that each hue of the three primary colors of the third-color-space first color range is the same as each hue of the three primary colors of the first color space, the hue is not necessarily retained for an arbitrary intermediate color obtained by adding up the respective primary colors in an arbitrary ratio.

To retain the hue of the first color space for hues of intermediate colors of the third-color-space first color range, a ratio of each luminance of the three primary colors of the third-color-space first color range may be determined such that the white coordinate determined by adding up the three primary colors of the third-color-space first color range becomes identical to the white coordinate of the first color space.

Figure 5:
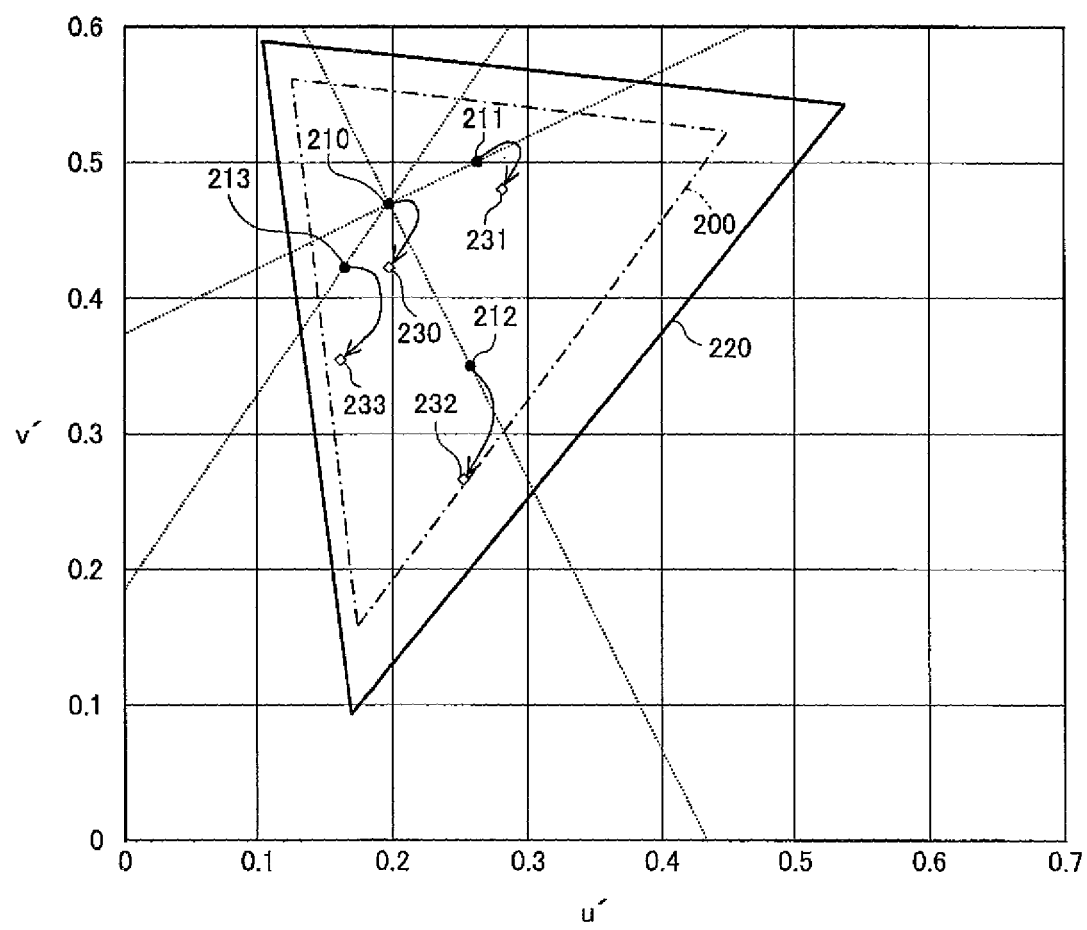
FIG. 5 is a chromaticity diagram of an example in the case of determining a third color space without considering a white coordinate, according to the first embodiment of the present invention.
Figure 6:
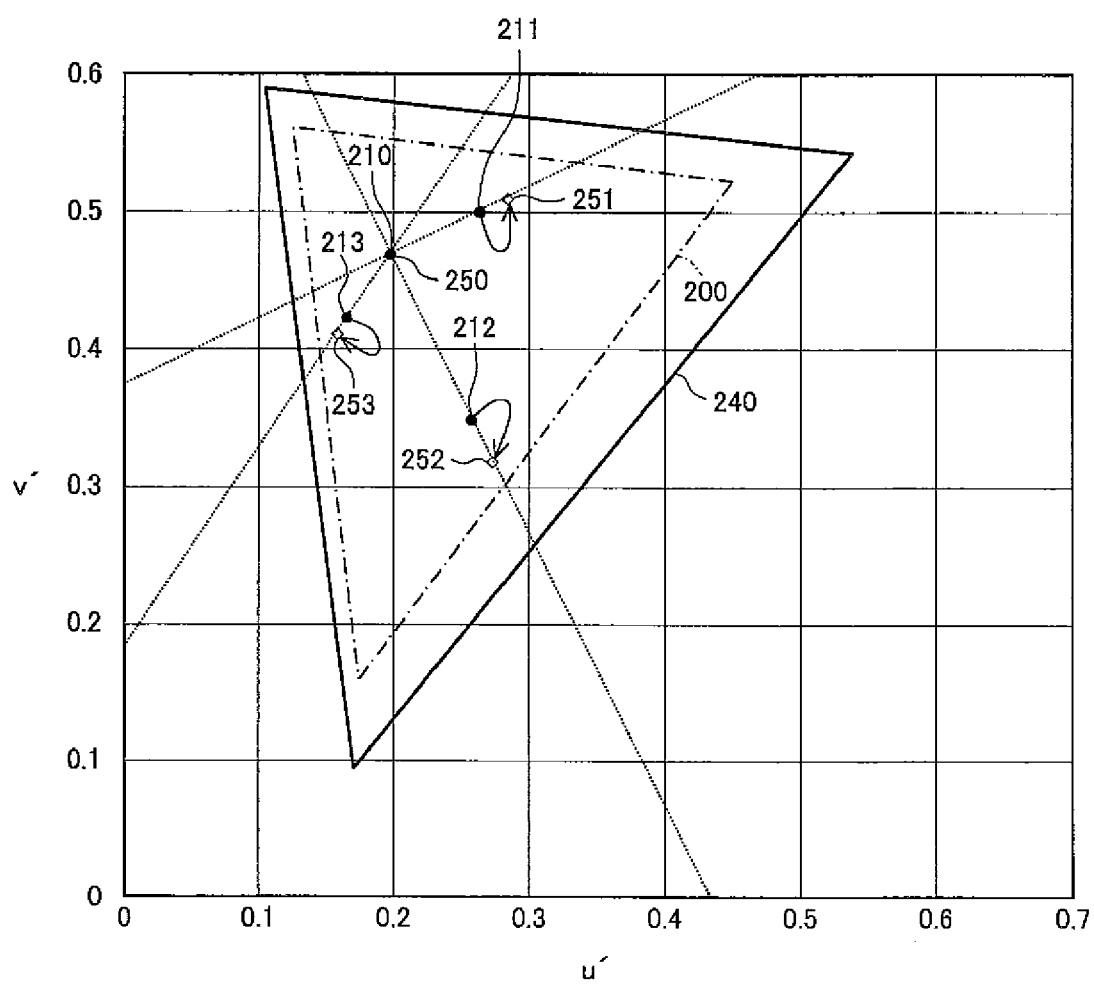
FIG. 6 is a chromaticity diagram of an example in the case of determining the third color space in consideration of a white coordinate, according to the first embodiment of the present invention.

FIG. 5 shows an example that the chromaticity coordinates of the three primary colors of the third-color-space first color range are determined to have the hues the same as those of the primary colors of the first color space and the luminance ratio among the three primary colors of the third-color space first color range is the same as the luminance ratio among the three primary colors of the first color space, and FIG. 6 shows an example that the chromaticity coordinates of the three primary colors are the same as those in the former case, the luminance ratio among the three primary colors of the third-color-space first color range is determined such that the chromaticity coordinate of white of the third-color-space first color range becomes identical to the chromaticity coordinate of white of the first color space.

Chromaticity points 210 to 213 have the same chromaticity coordinates in FIGS. 5 and 6; the chromaticity point 210 represents the white coordinate of the first color space; and the chromaticity points 211 to 213 represent colors indicated in the first color space by suitable different RGB signals. The colors obtained by converting the colors of the chromaticity points 210 to 213 to the third-color-space first color range are the chromaticity points 230 to 233 of FIG. 5 and the chromaticity points 250 to 253 of FIG. 6, respectively. In FIG. 6, the chromaticity point 250 is identical to the chromaticity point 210, which is the white coordinate.

While hues are changed due to the conversion in all the colors of the four points in the case of FIG. 5 where no consideration is given to the white coordinate, it can be seen in FIG. 6 that the colors of the third-color-space first color range have the same hues as those of the colors in the first color space. Although only a few colors are taking as an example in FIGS. 5 and 6, this relation holds good for all the colors as long as the white coordinate is determined to be the same as that of the first color space.

An example of a specific method will be described for enhancing the saturation while retaining the hues of the three primary colors without changing the white coordinate. It is assumed that the tristimulus values of the three primary colors of the first color space are $[X_{Ar},Y_{Ar},Z_{Ar}]$, $[X_{Ag},Y_{Ag},Z_{Ag}]$, and $[X_{Ab},Y_{Ab},Z_{Ab}]$ and that the tristimulus value of white of the first color space is $[X_{Aw},Y_{Aw},Z_{Aw}]$, which is a sum of the tristimulus values of the three primary colors. It is also assumed that the tristimulus values of the three primary colors of the third color space are $[X_{Br},Y_{Br},Z_{Br}]$, $[X_{Bg},Y_{Bg},Z_{Bg}]$, and $[X_{Bb},Y_{Bb},Z_{Bb}]$. As shown in the following Eq. 15, the tristimulus values of the three primary colors of the first color space are multiplied by the same constant and the tristimulus values having the same rate as that for white of the first color space are added thereto to determine the tristimulus values of the third-color-space first color range.

[Expression 14]

$$\begin{pmatrix} X_{Br} \\ Y_{Br} \\ Z_{Br} \end{pmatrix} = a \begin{pmatrix} X_{Ar} \\ Y_{Ar} \\ Z_{Ar} \end{pmatrix} + b_1 \begin{pmatrix} X_{Aw} \\ Y_{Aw} \\ Z_{Aw} \end{pmatrix}$$

$$\begin{pmatrix} X_{Bg} \\ Y_{Bg} \\ Z_{Bg} \end{pmatrix} = a \begin{pmatrix} X_{Ag} \\ Y_{Ag} \\ Z_{Ag} \end{pmatrix} + b_2 \begin{pmatrix} X_{Aw} \\ Y_{Aw} \\ Z_{Aw} \end{pmatrix}$$

$$\begin{pmatrix} X_{Bb} \\ Y_{Bb} \\ Z_{Bb} \end{pmatrix} = a \begin{pmatrix} X_{Ab} \\ Y_{Ab} \\ Z_{Ab} \end{pmatrix} + b_3 \begin{pmatrix} X_{Aw} \\ Y_{Aw} \\ Z_{Aw} \end{pmatrix}$$

Eq. (15)

As a result, the relation of the tristimulus value $[X_{B1},Y_{B1},Z_{B1}]$ in the third color space to an arbitrary RGB signal $[R_1,G_1,B_1]$ can be expressed as follows.

[Expression 15]

$$\begin{pmatrix} X_{B1} \\ Y_{B1} \\ Z_{B1} \end{pmatrix} = R_1/255 \begin{pmatrix} X_{Br} \\ Y_{Br} \\ Z_{Br} \end{pmatrix} + G_1/255 \begin{pmatrix} X_{Bg} \\ Y_{Bg} \\ Z_{Bg} \end{pmatrix} + B_1/255 \begin{pmatrix} X_{Bb} \\ Y_{Bb} \\ Z_{Bb} \end{pmatrix}$$

$$= a \cdot \left\{ R_1/255 \begin{pmatrix} X_{Br} \\ Y_{Br} \\ Z_{Br} \end{pmatrix} + G_1/255 \begin{pmatrix} X_{Bg} \\ Y_{Bg} \\ Z_{Bg} \end{pmatrix} + B_1/255 \begin{pmatrix} X_{Bb} \\ Y_{Bb} \\ Z_{Bb} \end{pmatrix} \right\} + (b_1 \cdot R_1/255 + b_2 \cdot G_1/255 + b_3 \cdot B_1/255) \begin{pmatrix} X_{Aw} \\ Y_{Aw} \\ Z_{Aw} \end{pmatrix} \quad \text{Eq. (16)}$$

The relation of the tristimulus value $[X_{A1}, Y_{A1}, Z_{A1}]$ in the first color space to the RGB signal $[R_1, G_1, B_1]$ can be expressed as follows.

[Expression 16]

$$\begin{pmatrix} X_{A1} \\ Y_{A1} \\ Z_{A1} \end{pmatrix} = R_1/255 \begin{pmatrix} X_{Ar} \\ Y_{Ar} \\ Z_{Ar} \end{pmatrix} + G_1/255 \begin{pmatrix} X_{Ag} \\ Y_{Ag} \\ Z_{Ag} \end{pmatrix} + B_1/255 \begin{pmatrix} X_{Ab} \\ Y_{Ab} \\ Z_{Ab} \end{pmatrix} \quad \text{Eq. (17)}$$

A tristimulus value $[X_{Bw}, Y_{Bw}, Z_{Bw}]$ of the third color space corresponding to an RGB signal [255,255,255] representing white is obtained from Eq. 16 as follows.

[Expression 17]

$$\begin{pmatrix} X_{Bw} \\ Y_{Bw} \\ Z_{Bw} \end{pmatrix} = a \begin{pmatrix} X_{Ar} + X_{Ag} + X_{Ab} \\ Y_{Ar} + Y_{Ag} + Y_{Ab} \\ Z_{Ar} + Z_{Ag} + Z_{Ab} \end{pmatrix} + (b_1 + b_2 + b_3) \begin{pmatrix} X_{Aw} \\ Y_{Aw} \\ Z_{Aw} \end{pmatrix} \quad \text{Eq. (18)}$$

$$= (a+b) \begin{pmatrix} X_{Aw} \\ Y_{Aw} \\ Z_{Aw} \end{pmatrix}$$

Therefore, the chromaticity coordinate is not changed from white of the first color space. It is also defined that
[Expression 18]

$$b_1 + b_2 + b_3 = b \quad \text{Eq. (19)}$$

is satisfied.

Since it is apparent that the chromaticity coordinate is not changed if the tristimulus value is multiplied by a constant and it is well-known that a chromaticity coordinate of a color created by additively mixing two colors is located at a point on a line segment linking the chromaticity coordinates of the two added color, it can easily be understood that the saturation is changed without changing the hue if the tristimulus value is added or subtracted at the ratio of white. Assuming that the tristimulus value of white is not changed after the conversion to the third-color-space first color range, from Eq. 18,
[Expression 19]

$$b = 1 - a \quad \text{Eq. (20)}$$

can be obtained.

Since the relations are satisfied that hues of the three primary colors are not changed for arbitrary $b_1$, $b_2$, and $b_3$ satisfying above Eq. 20 and that the chromaticity coordinate of white is not changed, arbitrary values satisfying Eq. 20 may be selected for $b_1$, $b_2$, and $b_3$. For example, it is possible to make $b_1 = b_2 = b_3$ that means to add the same tristimulus value to the three primary colors, respectively. In another example, it is possible to define as $b_1:b_2:b_3=Y_{Ar}:Y_{Ag}:Y_{Ab}$ in order to make the ratio of $b_1$, $b_2$, and $b_3$ equal to the luminance ratio of the three primary colors of the first color space. That means,

[Expression 20]

$$b_1 = (1-a) \cdot Y_{Ar}/Y_{Aw}$$
$$b_2 = (1-a) \cdot Y_{Ag}/Y_{Aw} \quad \text{Eq. (21)}$$
$$b_3 = (1-a) \cdot Y_{Ab}/Y_{Aw}$$

Therefore, Eq. 15 is rewritten as follows:

[Expression 21]

$$\begin{pmatrix} X_{Br} \\ Y_{Br} \\ Z_{Br} \end{pmatrix} = a \begin{pmatrix} X_{Ar} \\ Y_{Ar} \\ Z_{Ar} \end{pmatrix} + (1-a) \cdot Y_{Ar}/Y_{Aw} \begin{pmatrix} X_{Aw} \\ Y_{Aw} \\ Z_{Aw} \end{pmatrix} \quad \text{Eq. 22}$$

$$\begin{pmatrix} X_{Bg} \\ Y_{Bg} \\ Z_{Bg} \end{pmatrix} = a \begin{pmatrix} X_{Ag} \\ Y_{Ag} \\ Z_{Ag} \end{pmatrix} + (1-a) \cdot Y_{Ag}/Y_{Aw} \begin{pmatrix} X_{Aw} \\ Y_{Aw} \\ Z_{Aw} \end{pmatrix}$$

$$\begin{pmatrix} X_{Bb} \\ Y_{Bb} \\ Z_{Bb} \end{pmatrix} = a \begin{pmatrix} X_{Ab} \\ Y_{Ab} \\ Z_{Ab} \end{pmatrix} + (1-a) \cdot Y_{Ab}/Y_{Aw} \begin{pmatrix} X_{Aw} \\ Y_{Aw} \\ Z_{Aw} \end{pmatrix}$$

And the following equation is satisfied for an arbitrary value of a,
[Expression 22]

$$Y_{Br} = Y_{Ar}$$

$$Y_{Bg} = Y_{Ag}$$

$$Y_{Bb} = Y_{Ab} \quad \text{Eq. (23)}$$

and each luminance of the three primary colors becomes equal in the first color space and the third-color-space first color range. It is also apparent from the first line of Eq. 16 and Eq. 17 that $Y_A = Y_B$ is satisfied for an arbitrary RGB signal $[R_1, G_1, B_1]$ if $Y_{Ar} = Y_{Br}$, $Y_{Ag} = Y_{Bg}$, and $Y_{Ab} = Y_{Bb}$ are satisfied. That is, if $b_1$, $b_2$, and $b_3$ are defined for an arbitrary a as in Eq. 21, not only hues but also luminances are retained in the third-color-space first color range, for the first color space and all the colors.

Figure 7:
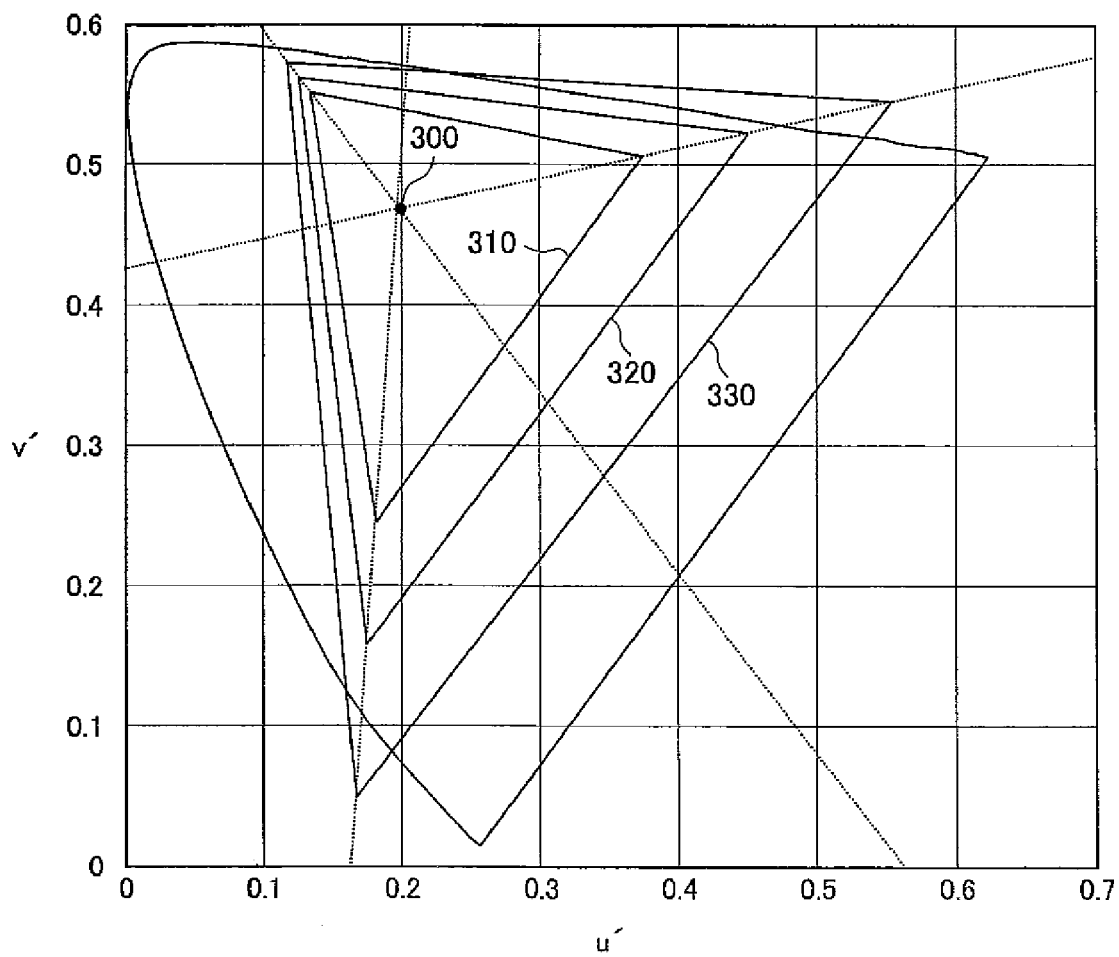
FIG. 7 is a chromaticity diagram showing changes in the third color space when the first color space is defined as sRGB and a is changed.

FIG. 7 is a view of changes in the third-color-space first color range when the first color space is defined as sRGB and a is changed. When the relation among $b_1$, $b_2$, and $b_3$ is determined, the third color space is defined only by a. In FIG. 7, 300 denotes a white coordinate; 310 denotes a third-color-space first color range at a=0.8; 320 denotes a third-colorspace first color range at a=1.0; and 330 denotes a third-color-space first color range at a=1.2.

It can be seen that the third-color-space first color range is identical to the first color space if a=1.0, that the third-color-space first color range has the same hues as that of the first color space and the lower overall saturation if a<1, and that the third-color-space first color range has the same hues as that of the first color space and the higher overall saturation if a>1. Therefore, "a" represents a degree of enhancement of the saturation. A value of "a" may be determined such that the third-color-space first color range includes a wider area of the second color space when the third-color-space first color range is compared with the second color space of the color image displaying portion 13 on a chromaticity diagram as the value of "a" is changed.

In the method of defining the third-color-space first color range described above, since the third-color-space first color range may be defined by adjusting only one parameter "a", a degree of enhancement of the saturation may easily be changed. In a definition method other than defining the third-color-space first color range only by the calculations of the tristimulus values XYZ, after freely defining the chromaticity coordinates of the three primary colors on half lines linking the white coordinate of the first color space and the chromaticity coordinates of the three primary colors of the first color space in the u'v' chromaticity diagram, the xy chromaticity diagram (CIE1931 chromaticity diagram), or a uniform color space such as a CIE1976*a*b* color space and a CIE1976L*u*v* color space, the luminance ratio of the three primary colors of the third-color-space first color range may be determined such that the chromaticity coordinate of white of the third-color-space first color range becomes identical to the chromaticity coordinate of white of the first color space.

Although the primary colors of the third-color-space first color range may be defined as colors at chromaticity coordinates outside of the half lines linking the white chromaticity coordinate and the chromaticity coordinates of the three primary colors, it is desirable in this case that differences between the dominant wavelengths of the three primary colors of the first color space and the dominant wavelengths of the three primary colors of the third color space fall within a range of ±2 nm, respectively so as to constrain changes in the overall hue of color in the third-color-space first color range due to changes in the hue of the three primary colors. This is because a human can generally distinguish between the lights having dominant wavelengths with a difference of 2 nm in the most sensitive waveband.

In the third-color-space second color range, the direction of change in hue is changed to a direction different from the third-color-space first color range while retaining the continuity of color at the boundary between the third-color-space second color range and the third-color-space first color range. This change in hue is made such that the third color space includes a larger area of the second color space, and in the case of the three-primary-color display device as in this embodiment, colors displayed for the input video signals representing the primary colors are changed toward the original primary colors of the display device. By defining the third color space in this way, a continuous change in color of the first color space before the conversion becomes continuous in the third color space, and a wider color reproduction range can naturally be implemented without sudden jump in color due to the conversion.

A specific method of setting the third color space will be described. If a degree of enhancement of the saturation in the third-color-space first color range is set too high, a sense of discomfort tends to be experienced especially in skin color etc. Therefore, it is desirable that colors sensitive to changes in saturation are included in the third-color-space first color range and a degree of enhancement of the saturation are constrained. As a result of a subjective evaluation experiment by ten subjects, it is shown that a preferable third-color-space first color range is a range including skin color and colors of blue sky and green leaves besides white and a degree of enhancement of the saturation in the third-color-space first color range is desirable when the above mentioned "a" is on the order of 1.0 to 1.2, that means to give a slight enhancement or none.

When defining the third-color-space first color range, a correction may be made in consideration of reproduction of a memory color such as constraining the saturation and enhancing the brightness of skin color. In this case, it is appropriate to define coordinates of several points to create LUT having other points interpolated between the points since problems are generated in continuity of values in the case of matrix operations.

In the definition of the third-color-space second color range, as a result of the subjective evaluation experiment, it is shown that a sense of discomfort is less experienced if a degree of enhancement of the saturation is changed greater than the case of the third-color-space first color range and that no considerable sense of discomfort is experienced if the hue is gradually changed. Since this tendency is more apparent in colors originally having higher saturations, a degree of enhancement of the saturation may be increased and the hue may be changed more significantly for the color range located at the outer side of the third color space. As a result of a subjective evaluation experiment performed with LUT created by changing the definition of the third-color-space second color range changed while retaining the constant definition of the third-color-space first color range, it is shown that although the color reproduction range of the display device is preferably and finally used to the limit with regard to the saturation, a better result is obtained by slightly reducing the brightness in areas with high saturation, that problems are less likely to occur even if the hue of a primary color is changed by about 10 nm with regard to the hue, and that acceptable values for changes in the hue are smaller in complementary colors as compared to the primary colors.

Figure 8:
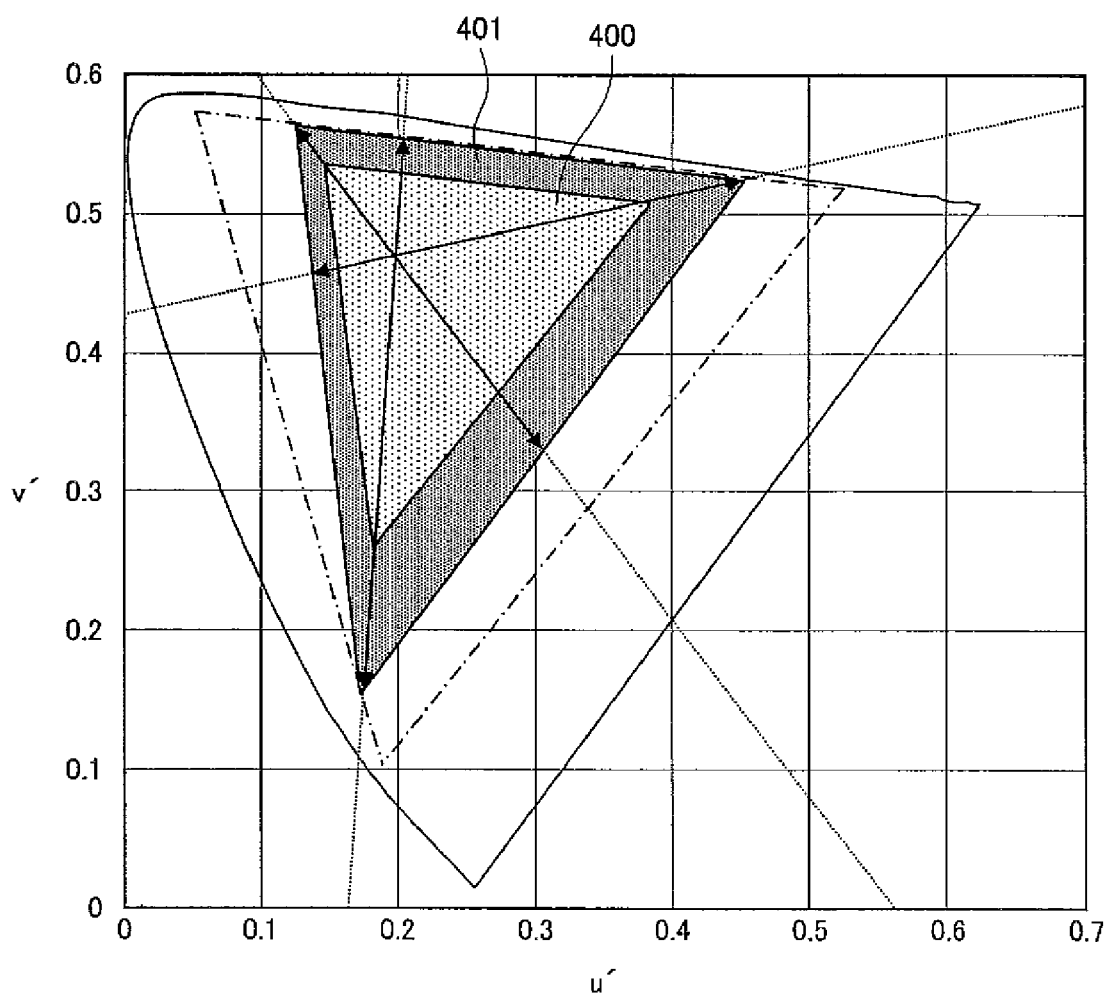
FIG. 8 is a view of a color range in the first color space and tracks of hue moving from white to primary colors and complementary colors of the primary colors.
Figure 9:
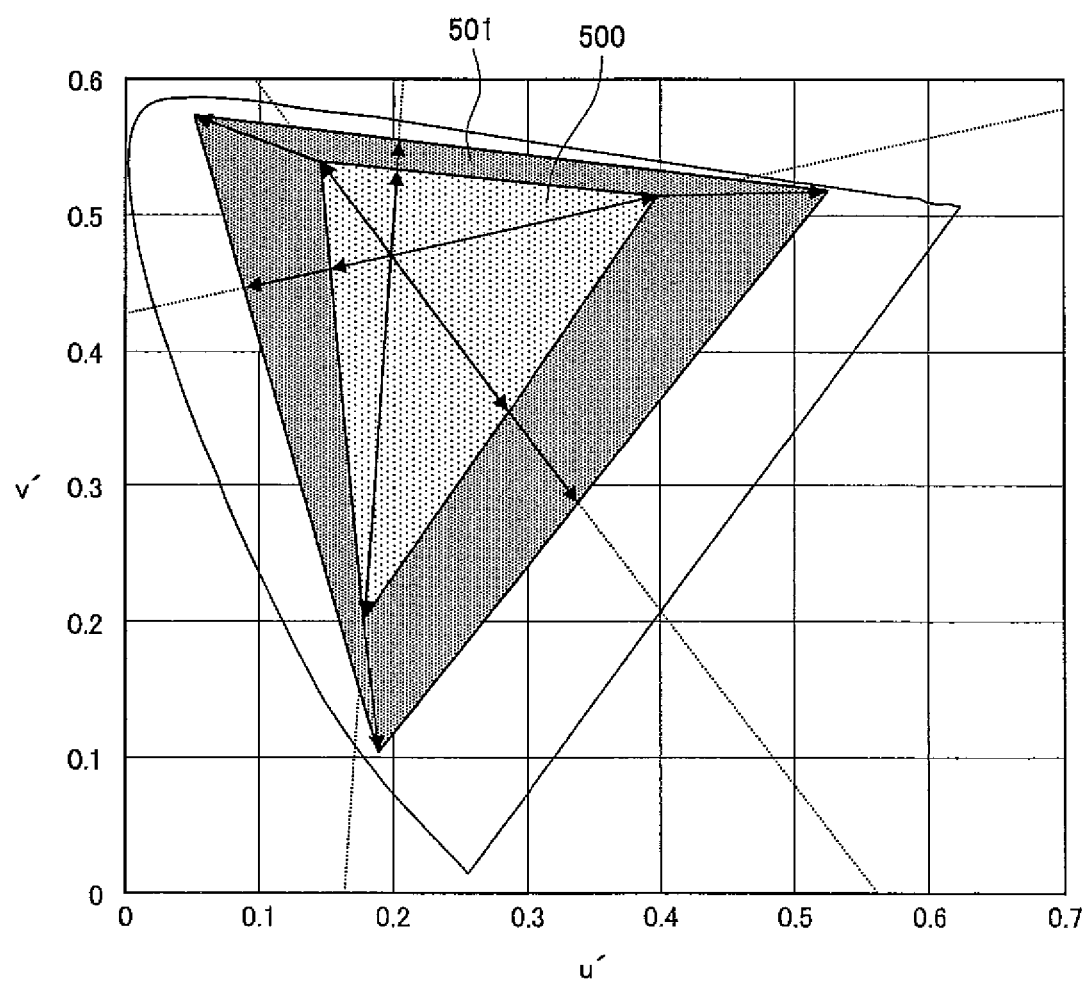
FIG. 9 is a view of a color range in the first color space and locus of hue moving from white to primary colors and complementary colors of the primary colors.

FIGS. 8 and 9 show examples of color ranges in the first color space and the third color space. Reference numerals 400 and 500 denote the first color range and this color range is converted to the third color space with the saturation slightly enhanced while retaining the hue of the first color space. Reference numerals 401 and 501 denote the second color ranges and, in each of this color range, the first color space is converted into the third color space with the saturation enhanced while gradually changing the hue and retaining the color continuity at the boundary between this color range and the above first color range.

Since the third-color-space second color range needs the color continuity with the adjacent third-color-space first color range, video signals cannot basically be converted by one linear matrix operation as in the case of the third-color-space first color range. This is because even if the primary color signals are continuous between the third-color-space first color range and the third-color-space second color range, a color obtained by adding up the primary color signals may become discontinuous due to the primary color coordinates and the luminance ratio of the primary colors in the second color range of the third color space. This is because although the locus of change in color from white to primary colors is obviously a straight line, the locus is folded at each border of color ranges in the third color space and, therefore, the weighting at the time of adding up the primary colors is changed between the first color space and the second color range of the third color space. If this weighting is corrected, the conversion can be performed by the matrix operation even in the third-color-space second color range.

To correct the gamma characteristics of the color image displaying portion 13, the gamma characteristics are acquired (measured) for red/blue/green (step S8). If it is known that no considerable difference exits in the gamma characteristics of red/blue/green, all the gamma characteristics of red/blue/green may not be measured and only the gamma characteristic may be measured instead. Alternatively, the degamma conversion may be performed from the gamma setup value set for the color image displaying portion 13 without performing the measurement.

The color converting portion 12 of FIG. 1 converts the video signal based on the information obtained up to this step (step S9). The gamma converting portion 12a eliminates the effects of the gamma characteristics added to the video signal. The video signal converting portion 12b then converts the RGB values of the video signal into the XYZ values of the first color space and further converts the XYZ values into the XYZ values of the third color space and into the RGB values for the display device. The degamma conversion portion 12c adds inverse gamma characteristics of the characteristics possessed by the color image displaying portion 13 and outputs the values to the color image displaying portion. The internal processing of the video signal converting portion 12b may be integrated to obtain the RGB values directly from the RGB values, or LUT may be created that includes the characteristics of the gamma converting portion 12a and the degamma conversion portion 12c added to the input/output characteristics of the color converting portion.

When the color conversion of this embodiment is performed as above, the color converted to the third-color-space first color range is reproduced with the hue in the color space of the video signal retained, and the color in the third-color-space second color range is reproduced by the color image displaying unit 13 as a vivid video with the hue continuously changed and the saturation enhanced in accordance with the color reproduction range of the color image displaying unit 13. A dividing method of the color ranges of the third color space is not limited to the dividing method described above, and the boundaries (boundary surfaces) between the color ranges may be curved lines (curved surfaces).

Figure 10:
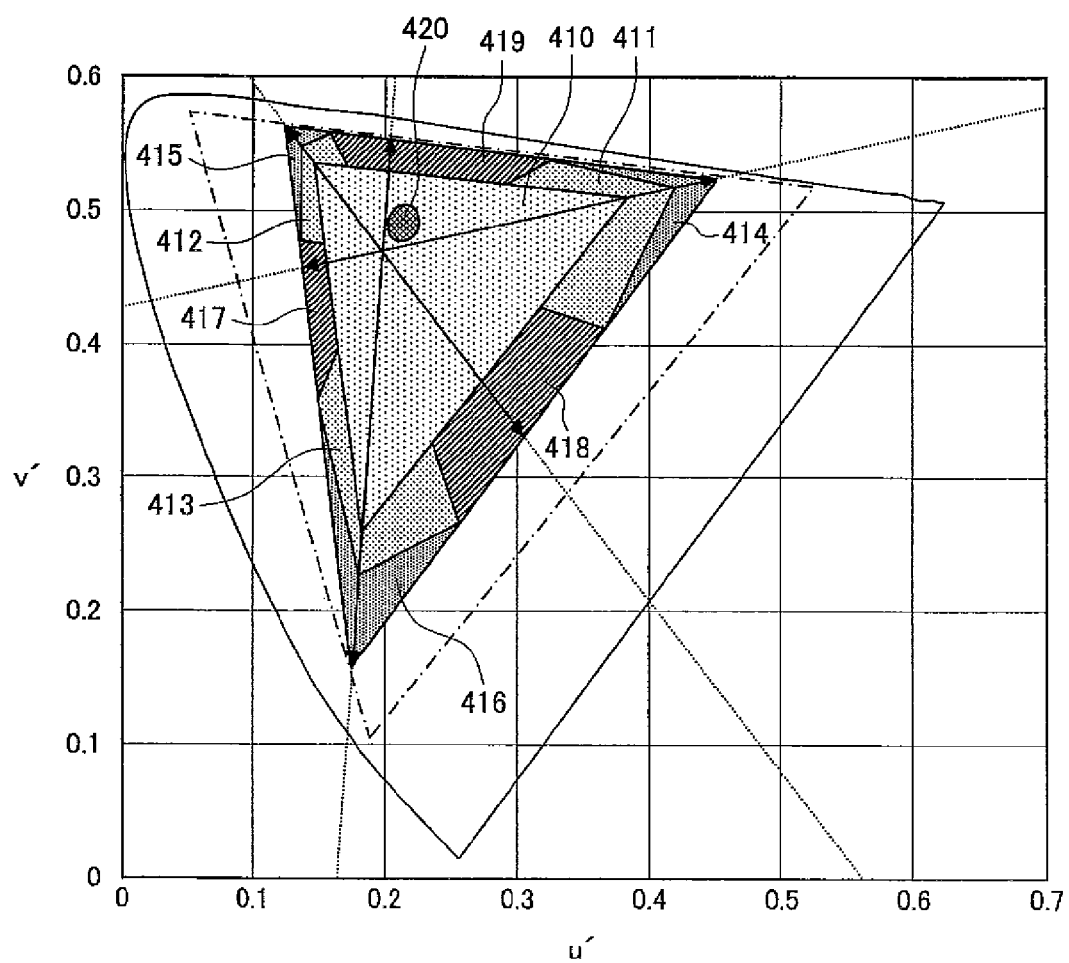
FIG. 10 is a chromaticity diagram of an example of conversion of the first color space by the color converting portion according to a modification of the first embodiment of the present invention.
Figure 11:
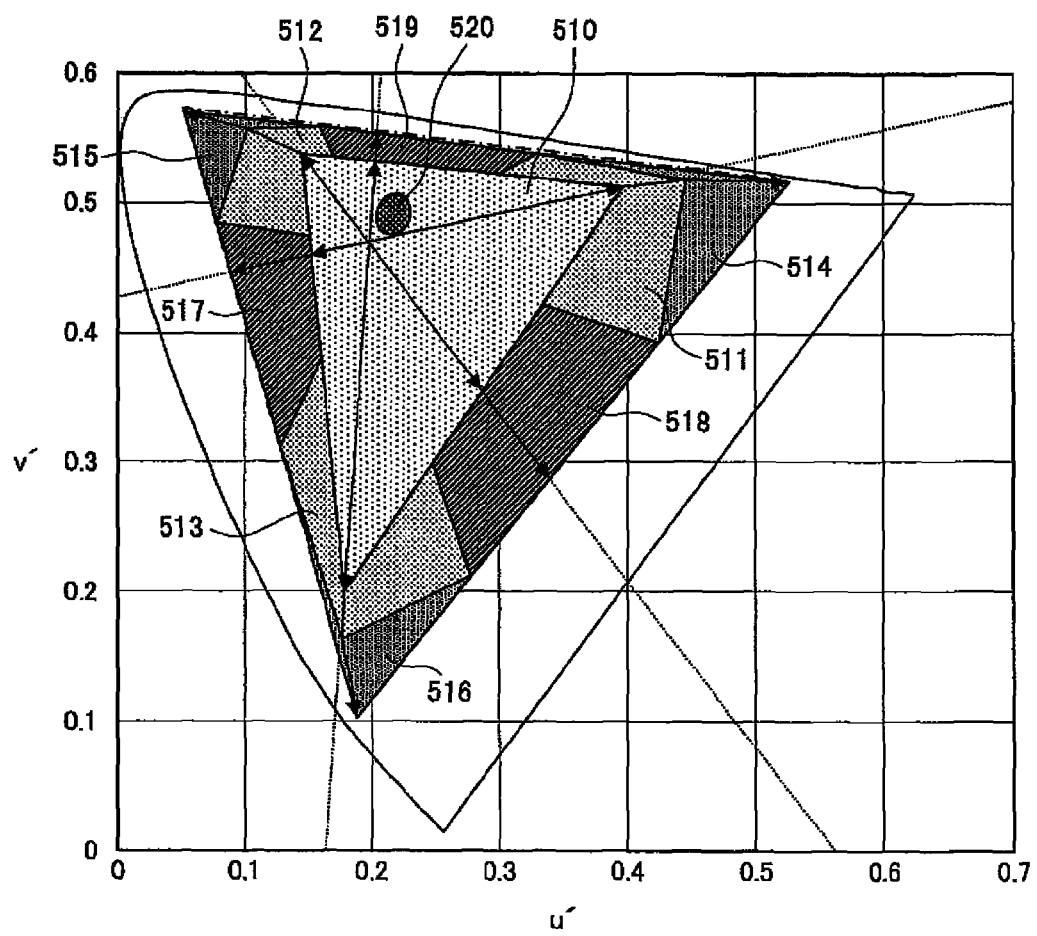
FIG. 11 is a chromaticity diagram of an example of conversion of the third color space by the color converting portion according to a modification of the first embodiment of the present invention.

A modification of the first embodiment will then be described. Although the color range is divided into the first color range and the second color range as shown in FIGS. 8 and 9, the color range may be divided into more color ranges for the conversion. FIGS. 10 and 11 shows an example of the case that the first color space and the third color space are divided into more color ranges. A first color range is a color range including white. A second color range is a color range adjacent to a portion of the first color range and including portions of colors having the same hues as those of the primary colors. A third color range is a color range adjacent to the second color range and including colors with the saturation higher than those of the second color range, and the third color range also includes portions of colors having the same hues as those of the primary colors. A fourth color range is a color range adjacent to the first color range along with the second color range and not including portions of colors having the same hues as those of the primary colors. A portion of the first color range is particularly separated from the first color range and defined as a fifth color range. To prevent a color jump that should not normally exist from being generated due to a discontinuous portion of a change in color at the boundary between the color ranges after the conversion, a change in color is made continuous at the boundary between adjacent color ranges.

In FIGS. 10 and 11, reference numerals 410 and 510 denote the first color ranges and each of these color range is converted to the third color space with the saturation slightly enhanced while retaining the hue of the first color space. Reference numerals 411 to 413 and 511 to 513 denote the second color ranges, each of which is converted to the third color space with the saturation enhanced while gradually changing the hue. Reference numerals 414 to 416 and 514 to 516 denote the third color ranges, each of which is converted from the first color space to the third color space with the saturation enhanced while further changing the hue toward the original hue of the display device as compared to the second color range. Reference numerals 417 to 419 and 517 to 519 denote the fourth color ranges, each of which is converted from the first color space to the third color space with the saturation enhanced while retaining the hues of complementary colors of the primary colors among others in this embodiment. In the first color range, each of the fifth color ranges indicated by 420 and 520, respectively, is converted from the first color space to the third color space such that a color closer to a memory color is achieved while retaining the continuity of color from the surrounding color ranges. In this embodiment, the first color range is defined as a range of the skin color by way of example, and the brightness of this color range is relatively increased to enable reproduction of the skin color closer to a memory color. The processing after defining the third color space is the same as the processing described above.

Since a degree of enhancement of the saturation is greater in the third color range than the second color range, a degree of enhancement of the saturation in the second color range becomes moderate as compared to that of the first embodiment. Therefore, a difference of changes in saturation becomes moderate between the first color range and the second color range and provides a more natural feeling. Since the hues of complementary colors are not greatly changed as compared to the primary color hues in the fourth color range, unnaturalness of hue may be alleviated in bright yellow, etc. In the fifth color range, more preferable skin color may be reproduced buy reproducing a color closer to the memory color.

Second Embodiment

A second embodiment of the present invention will then be described.

This embodiment is an example of a method for defining the third color space without LUT or weighting correction mentioned in the first embodiment in such a case that the color reproduction range of the display device is not so much larger than that in the first color space and the transfer function of the display device can be represented by a matrix.

Although the first color space is divided into a plurality of color ranges and each color range is converted to the third color space in the first embodiment, the entire first color space is once converted to a virtual color space (hereinafter, fourth color space) larger than the second color space of the display device and the third color space is defined as a color space converted from the fourth color space so as to fall within the second color space in this embodiment.

A specific method of defining the third color space will be described below.

Figure 12:
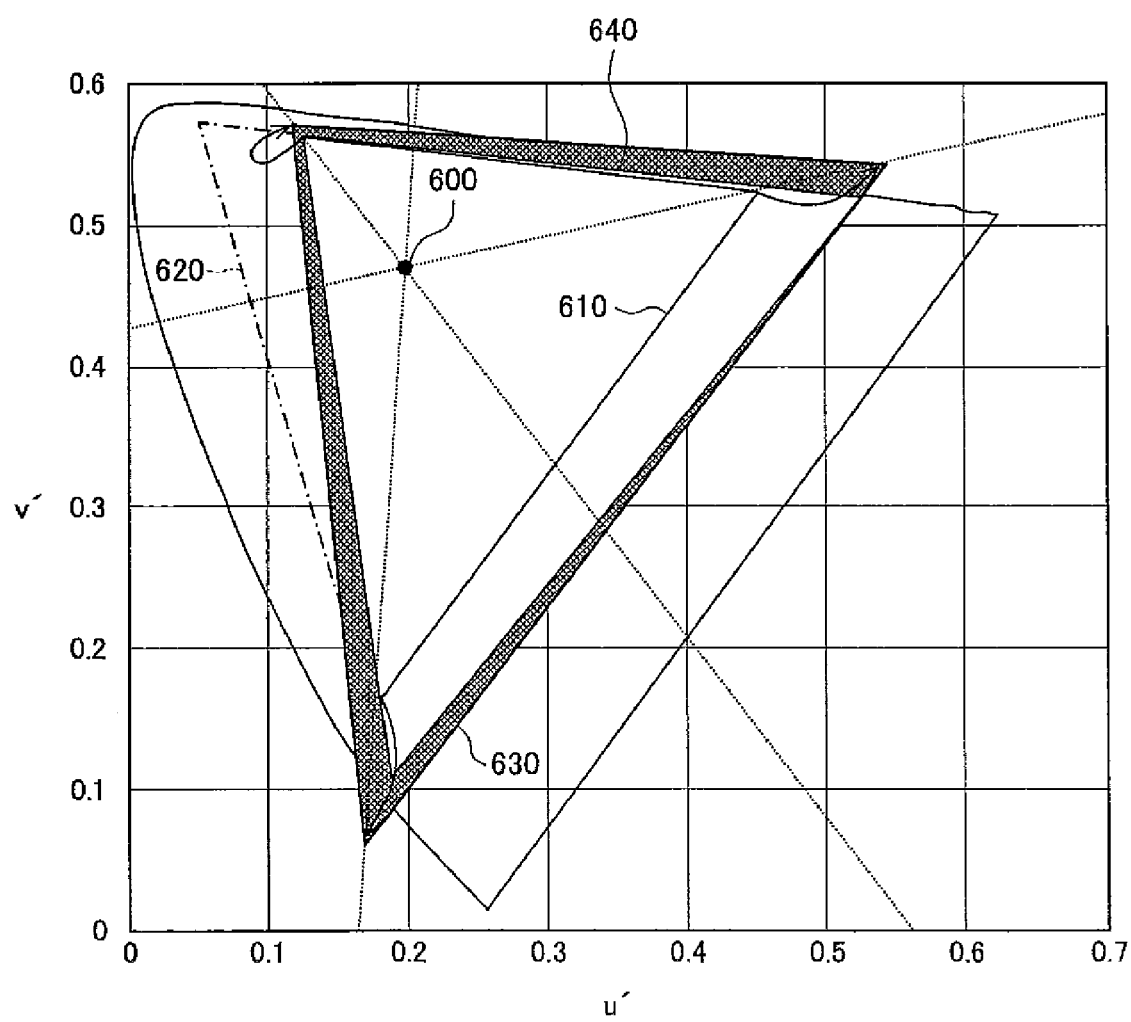
FIG. 12 is a chromaticity diagram of an example of conversion of the first color space by the color converting portion according to the second embodiment of the present invention.

In the calculation of defining the third-color-space first color range in the first embodiment, the fourth color space is defined by $b_1=b_2=b_3$ and $a=1.18$. In the u'v' chromaticity diagram shown in FIG. 12, a reference numeral 600 denotes the white coordinate; 610 denotes an sRGB space that is the first color space; 620 denotes the second color space of the color image displaying portion 13; and 630 denotes the fourth color space with the saturation enhanced while retaining the hue of the sRGB space. It is assumed that the tristimulus values of the primary colors of the fourth color space are $[X'_r, Y'_r, Z'_r]$, $[X'_g, Y'_g, Z'_g]$, and $[X'_b, Y'_b, Z'_b]$. The transfer function of the display device is expressed by Eq. 13 ignoring the noise component. As a result, the RGB-value calculating function S necessary for displaying an arbitrary tristimulus value is an inverse matrix of the transfer function T having three lines and three columns, and a conversion matrix C is defined as Eq. 24 to convert the input video signals to the video signals for reproducing the tristimulus values of the fourth color space with the color image displaying portion 13.

[Expression 23]

$$C = \left[ T^{-1} \begin{pmatrix} X'_r & X'_g & X'_b \\ Y'_r & Y'_g & Y'_b \\ Z'_r & Z'_g & Z'_b \end{pmatrix} \right]^{-1} \quad \text{Eq. (24)}$$

Eq. 25 is an example of an actually obtained conversion matrix C.

[Expression 24]

$$C = \begin{pmatrix} C_{11} & C_{12} & C_{13} \\ C_{21} & C_{22} & C_{23} \\ C_{31} & C_{32} & C_{33} \end{pmatrix} \quad \text{Eq. (25)}$$

$$= \begin{pmatrix} 0.664 & 0.358 & -0.051 \\ 0.002 & 1.013 & 0.009 \\ -0.055 & -0.047 & 1.235 \end{pmatrix}$$

However, even if an RGB signal is converted using this matrix, the converted signal may not fall within an effective range for RGB signals. Actually, when an RGB signal [R,G,B]=[255,255,255] is converted, the converted RGB signal is [R',G',B']=[248,256,289] including a numeric value greater than 255. This is caused because normalization of luminance is not performed between the fourth color space and the second color space and it is desirable to perform the normalization to avoid the saturation of the luminance after color conversion. The normalization is performed as follows. With regard to the conversion matrix C, when the conversion matrix is multiplied by the same constant $(1/C_m)$ such that the largest numeric value among the sums of positive elements of the lines does not exceed 1 (one), the above conversion matrix C is normalized to a conversion matrix $C_{normalized}$ of Eq. 26. Since the luminance is maximized within a range not saturating the luminance when the largest numeric value is one among the sums of positive elements of the lines, it is desirable to determine the constant $(1/C_m)$ such that this value becomes to one.

[Expression 25]

$$C_{normalized} = (1/C_m)C \quad \text{Eq. (26)}$$

$$= \begin{pmatrix} C'_{11} & C'_{12} & C'_{13} \\ C'_{21} & C'_{22} & C'_{23} \\ C'_{31} & C'_{32} & C'_{33} \end{pmatrix}$$

$$= \begin{pmatrix} 0.538 & 0.290 & -0.041 \\ 0.001 & 0.820 & -0.008 \\ -0.044 & -0.038 & 1.000 \end{pmatrix}$$

As a result, the converted RGB value does not exceed 255 for any RGB values within the effective range of input video signals, i.e. a range of 0 to 255, and the luminance may be avoided from being saturated.

In another method of avoiding the luminance after the color conversion from being saturated, if at least one value of the converted RGB signal exceeds 255, this value may be replaced with 255.

Since the fourth color space is defined to be larger than the second color space, one or more negative values are included in the elements of the matrix and, for example, if an ROB signal [R,G,B]=[0,0,255] is converted, is generated and since negative values are included, the specification of the standard RGB signals is not satisfied. If a negative value is included in the converted video signal, this is equivalent to trying to display a color on the outside of the color reproduction range of the color image displaying portion 13, and the color is undisplayable. This undisplayable color range is denoted by 640 of FIG. 12.

For example, the following method may be performed for processing such negative values.

The simplest processing for negative values is to replace the negative value with 0 (zero) when a negative value is generated after the conversion. As a result, a color that should be originally converted to the outside of the color reproduction range is converted in the manner as if it sticks to the boundary surface of the color reproduction range. Although a portion of color information is lost in an area outside the reproduction range of the color image displaying portion 13 and a different color is displayed due to this processing, since the hue is roughly correct and continuously changes in response to changes in the RGB signal values, this processing is effective for a simplified measure.

Figure 13:
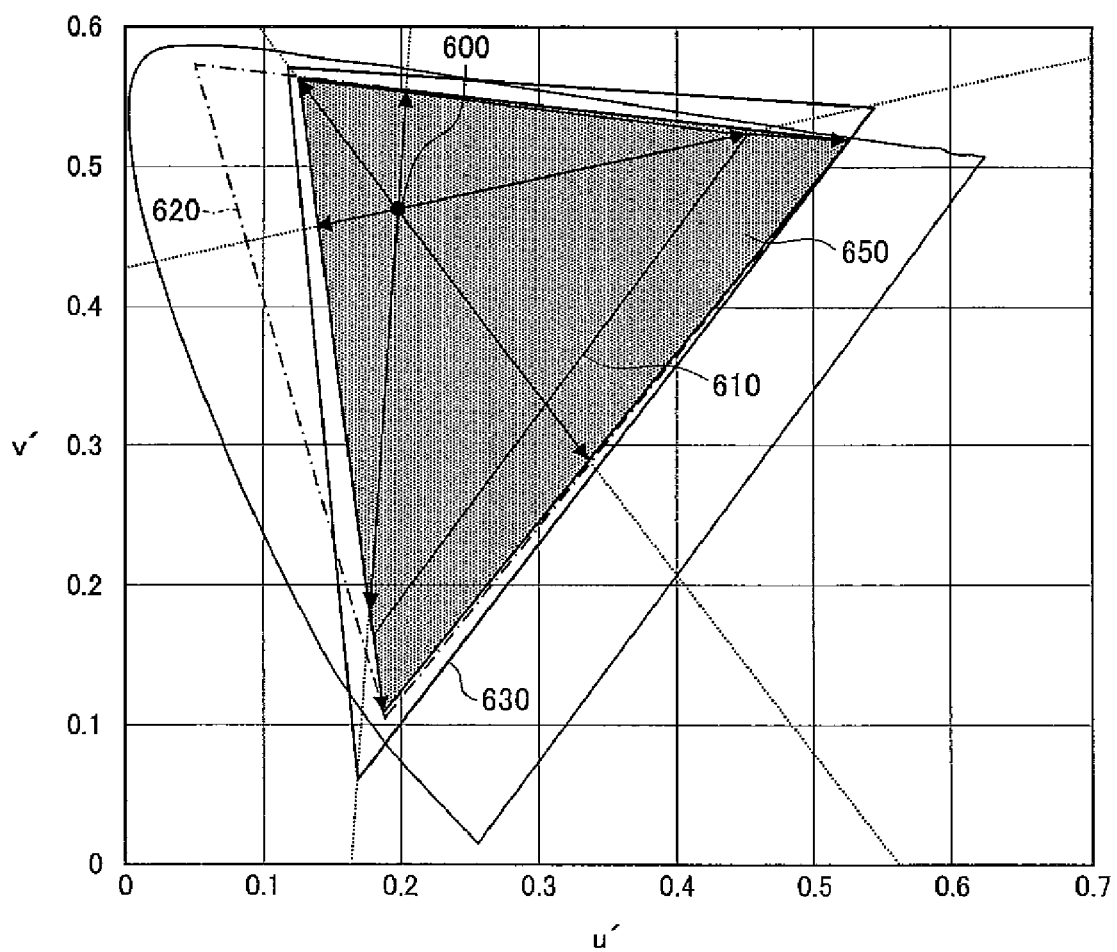
FIG. 13 is a chromaticity diagram of an example of conversion of the third color space by the color converting portion according to the second embodiment of the present invention.
Figure 14:
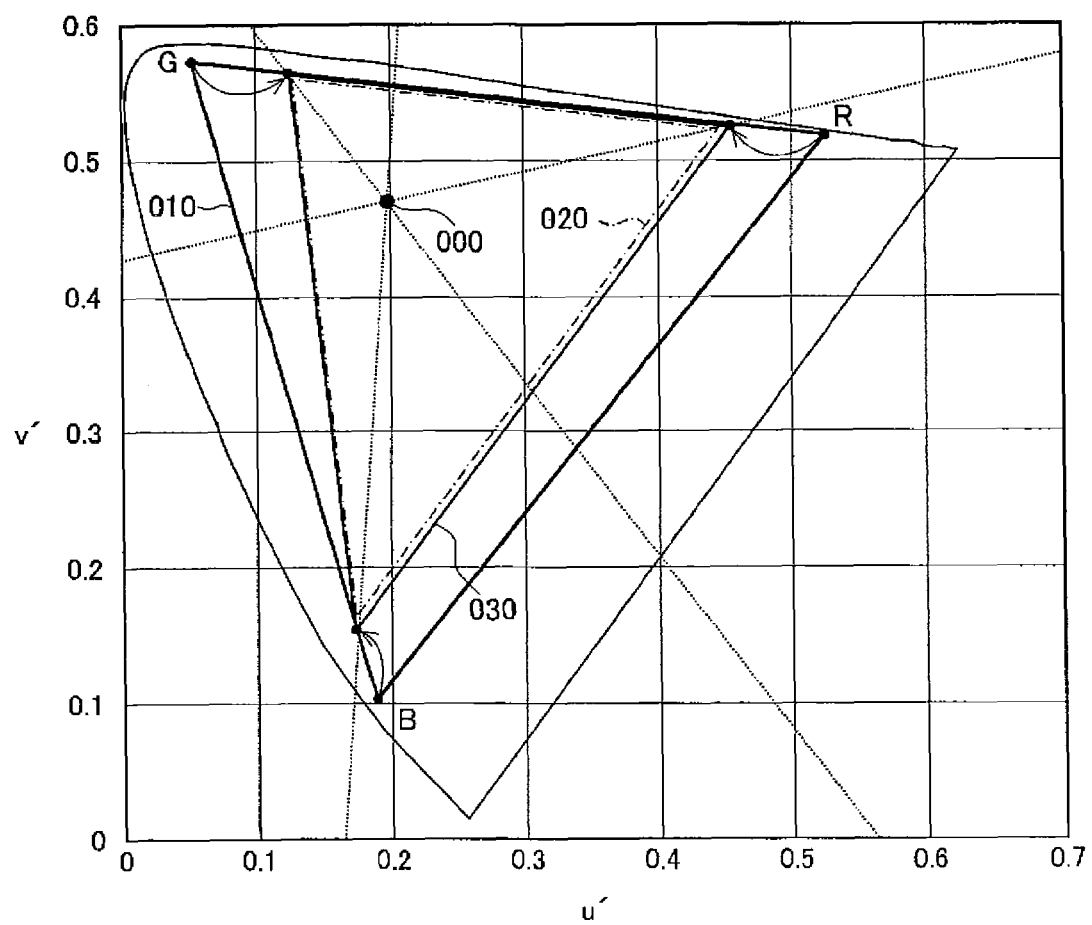
FIG. 14 is a chromaticity diagram of conversion of color space using a conventional color conversion device.

In this embodiment, a range of the fourth color space included in the second color space corresponds to the third-color-space first color range, and the third-color-space second color range corresponds to colors which are obtained by correcting colors in a range of the fourth color space exceeding the second color space in the second color space. The primary color hues of the third color space are finally defined as shown in FIG. 13, the saturation is enhanced while retaining the hue in the third-color-space first color range, the hue is continuously changed in the third-color-space second color range, and it can be seen that, a wider range, though it is not the entire color reproduction range of the display device, may be utilized as shown by 650.

The embodiment described above includes the following features.

A first feature provides a color conversion device that converts colors of the first color space to a third color space different from the first color space while retaining the hue of the first color space using information of a color reproduction range of a first color space possessed by an input video signal and information of a color reproduction range of a second color space possessed by a color image display device, wherein at least one color of the first color space is converted into a color within the third color space located on the outside of the second color space.

A second feature is the color conversion device of the first feature, wherein chromaticity coordinates of three primary colors making up the third color space are located on half lines linking the white coordinate and chromaticity coordinates of three primary colors of the first color space.

A third feature is the color conversion device of the first or second feature, wherein a luminance ratio of the three primary colors of the third color space is determined such that the white coordinate of the third color space becomes identical to the white coordinate of the first color space.

A fourth feature is the color conversion device of any one of the first to third features, wherein the color reproduction range of the third color space is defined by changing a parameter representing a degree of enhancement of the saturation.

A fifth feature is the color conversion device of any one of the first to fourth features, comprising a video signal converting portion for converting colors of the first color space possessed by an input video signal to the third color space and converting the input video signal into an output video signal for reproducing colors of the third color space with the color image display device.

A sixth feature is the color conversion device of the fifth feature, wherein the video signal converting portion performs operation using at least one conversion matrix to convert the input video signal into the output video signal, produces the conversion matrix using a transfer function specific to the color image display device and tristimulus values possessed by the three primary colors of the third color space, and multiplies the conversion matrix by a constant such that the output video signal does not exceed an effective maximum value for video signals.

A seventh feature is the color conversion device of the sixth feature, wherein if at least one value of the output video signal is converted into a negative value, processing for replacing the negative value with zero is performed to correct the third color space such that the third color space falls within a range reproducible with the display device.

An eighth feature is the color conversion device of the fifth feature, wherein if at least one value of the output video signal exceeds the effective maximum value for video signals, the value is replaced with the maximum value to correct the third color space such that the third color space falls within a range reproducible with the display device.

A ninth feature is the color conversion device of the eighth feature, wherein if at least one value of the output video signal is converted into a negative value, the negative value is replaced with zero to correct the third color space such that the third color space falls within a range reproducible with the display device.

A tenth feature is the color conversion device of the fifth feature, comprising a gamma converting portion that performs gamma conversion depending on the input video signal and a degamma converting portion that performs degamma conversion depending on gamma characteristics of the color image display device, wherein processes are executed in the order of the gamma converting portion, the video signal converting portion, and the degamma converting portion.

An eleventh feature is a color image display device comprising the color conversion device having any one of the first to tenth features.

Third Embodiment

A third embodiment of the present invention will then be described.

In the second embodiment, the sums of positive elements of the lines of Eq. 26 indicate how many times of the emission before the conversion corresponds to the maximum emission of red/blue/green LEDs after the conversion. Therefore, it is desirable that each of the sums is one for every LED. Since the sum of the first line corresponding to red is 0.828 in Eq. 26, a value greater than 0.828×255 does not appear after the conversion in red and green for any input video signal in this example, and the dynamic range of the color image displaying portion 13 is narrowed. The sum of positive elements of each line may be approximated to one to expand the dynamic range by individually changing the maximum emission amounts of the LEDs.

If the LED drive current is increased to increase an emission amount, a signal value of color corresponding to the LED may be reduced when a certain color is displayed. Therefore, the increase in the LED emission amount generally reduces the lines corresponding to the color of the LED and, conversely, the reduction in the LED emission amount generally increases the lines corresponding to the color of the LED. Since changes in the chromaticity coordinates of the LEDs are small in an area having the drive current sufficiently greater than a threshold current, the changes in the chromaticity coordinates may almost be ignored, and the same result may be achieved by individually changing the LED emission amounts and the elements of the corresponding line of the conversion matrix for the respective primary colors of red/green/blue. It can easily be understood that the LED emission amount necessary for acquiring the same result is in inverse proportion to the elements of the line corresponding to the LED in the conversion matrix. Therefore, the sum of each line may easily be approximated to one within a range having no element greater than one without performing remeasurement of the tristimulus values or definition of the second color space and the third color space. Since green most contributes to brightness among red/green/blue, a value of an element of the green line or the sum of the green line may be defined as the maximum value and the LED emission amounts of red and blue may be adjusted such that the elements and the sum of the red and blue lines are increased within a range not greater than this maximum value.

Eq. 27 is the conversion matrix normalized after the LED drive current of the color image displaying portion 13 is optimized as above. In this case, the emission amount of the green LED is not changed, and the emission amount of the red LED and the emission amount of the blue LED are increased by 1.015 times and 1.204 times, respectively.

[Expression 26]

$$C_{optimized} = \begin{pmatrix} C''_{11} & C''_{12} & C''_{13} \\ C''_{21} & C''_{22} & C''_{23} \\ C''_{31} & C''_{32} & C''_{33} \end{pmatrix} = \begin{pmatrix} 0.646 & 0.354 & -0.049 \\ 0.002 & 0.998 & -0.009 \\ -0.045 & -0.041 & 1.000 \end{pmatrix} \quad \text{Eq. (27)}$$

As a result, red is maximized to 255 at the input video signal of [R,G,B]=[255,255,0]; green is maximized to 255 at the input video signal of [R,G,B]=[255,255,0]; blue is maximized to 255 at the input video signal of [R,G,B]=[0,0,255]; and it can be seed that a wider dynamic range becomes available. Although the emission amount of the green LED is not changed here, the fixed LED may be another color or the emission amounts of all the LED may be changed of course.

A wider dynamic range of the color image displaying portion 13 may be utilized and gradation characteristics can be enhanced with the effect of the second embodiment remained effective.

Although the color image displaying portion 13 shown in FIG. 1 is a single plate DLP projector using DMD (Digital Micromirror Device, registered trademark) for the spatial light modulator 28 of FIG. 2, the color image displaying portion 13 may be a three-plate DLP projector using one DMD for each LED or a DLP projector provided with pluralities of LEDs and DMDs for each of the three primary colors, or a liquid crystal device may be used for the spatial light modulator 28. A light source may be laser instead of the LEDs or may be a high-pressure mercury lamp using color wheel with high color purity. Even in the case of a liquid crystal display using color filters with high color purity, a laser projector forming a video by scanning a screen while modulating emission intensity of laser, or a projector forming a video with the use of diffraction through hologram, the present invention is obviously applicable as long as a color image display device uses a video signal having video color information decomposed into three certain primary color components to emit light of the three primary colors of the color image display device depending on the signal values of the three primary color components of the video signal.

Even in the case of a multi-primary-color video signal using four or more primary colors and a multi-primary-color image forming apparatus using four or more primary colors, the effects of the present invention are directly applicable since procedures are changed only when obtaining color specification values such as XYZ represented by the input video signal and when obtaining a video signal for displaying the color specification values in the third color space.

Although eight-bit quantization from 0 to 255 is performed for all the RGB signal values in the examples described in the above embodiments, all the effects of the present invention is available of course.

Although the input video signal is the RGB signal in the above description, the effects of the present invention are obviously available as long as video signals may be converted to RGB signals through appropriate operations as in the case of color-difference signals.

The numbers and dividing methods of color ranges in the first color space and the third color space are not limited to those described as the embodiments of this description, the color spaces may be divided into different color ranges or more color ranges to perform different processing, or another color space may exist between the color spaces described in the examples of the embodiments. The number of color ranges may be increased to cause the hues to be changed in a curved manner.

As described above, according to the present invention, since hues and a degree of change in saturation of the color spaces of video signals are continuously changed depending on color ranges, color ranges sensitive to changes in hue and saturation may be reproduced approximating the reproduction of original colors of the video signals, and other colors may be reproduced as vivid video with increased saturation. Therefore, a wider color reproduction range may be utilized while solving the problem of unnatural colors generated in wide-color-range display device.

Since the correction for characteristics specific to the color image display device are separately performed for the gamma characteristic and the signal transfer characteristic represented by a transfer function, colors may be reproduced as intended by the color image display device. Since the gamma conversion depending on video signals, the correction of the transfer function specific to the color image display device, and the degamma conversion depending on the gamma characteristic of the color image display device are performed in this order, if the color image display device has characteristics different from intended gamma characteristics, intended colors may highly accurately be reproduced.

Since new chromaticity coordinates of three primary colors are defined on half lines linking the white chromaticity coordinate and the chromaticity coordinates of three primary colors of the video signal, the third-color-space first color range may easily be defined with a color reproduction range expanded without changing hues.

The invention claimed is:

1. A color image display device, comprising:
a receiver receiving an input video signal;
a color converter configured to convert a first color space of the input video signal into a second color space of the color image display device, wherein
the color image display device utilizes at least three primary colors to display an image,
the first color space includes
at least a first color range including white and a plurality of hues, and
a second color range, distinct from the first color range, having a plurality of hues and saturation for all hues higher than the first color range,
the color converter is configured to convert the first color range of the first color space into a first color range of the second color space, the first color range of the second color space including a color with saturation higher than saturation determined by the input video signal and a hue to be same as the hue determined by the input video signal in the first color range of the first color space, and
the color converter is further configured to convert the second color range of the first color space into a second color range of the second color space, the second color range of the second color space including a color with a hue different from the hue determined by the input video signal in the second color range.

2. The color image display device as defined in claim 1, wherein in the second color range, a color is displayed that is closer to a hue of a primary color of the color image display device as compared to the hue determined by the input video signal.

3. The color image display device as defined in claim 2, wherein the color ranges displayed by the color image display device further include a third color range having saturation higher than the second color range, and a color having a hue different from the hue determined by the input video signal but more closer to the hue of the primary color of the color image display device as compared to the color displayed in the second color range is displayed in the third color range.

4. The color image display device as defined in claim 3, wherein a color with saturation higher than the saturation determined by the input video signal is displayed in the second color range, and a degree of enhancement of the saturation is different from a degree of enhancement of the saturation in the first color range.

5. The color image display device as defined in claim 3, wherein the color ranges displayed by the color image display device further include a fourth color range having saturation higher than the second color range, and a color with saturation higher than the saturation determined by the input video signal is displayed with the hue determined by the input video signal in the fourth color range, and the degree of enhancement of the saturation is greater than the degree of enhancement of the saturation in the first color range and is different from the degree of enhancement of the saturation in the second color range.

6. The color image display device as defined in claim 2, wherein a color with saturation higher than the saturation determined by the input video signal is displayed in the second color range, and a degree of enhancement of the saturation is different from a degree of enhancement of the saturation in the first color range.

7. The color image display device as defined in claim 2, wherein the color ranges displayed by the color image display device further include a fourth color range having saturation higher than the second color range, and a color with saturation higher than the saturation determined by the input video signal is displayed with the hue determined by the input video signal in the fourth color range, and the degree of enhancement of the saturation is greater than the degree of enhancement of the saturation in the first color range and is different from the degree of enhancement of the saturation in the second color range.

8. The color image display device as defined in claim 1, wherein a color with saturation higher than the saturation determined by the input video signal is displayed in the second color range, and a degree of enhancement of the saturation is different from a degree of enhancement of the saturation in the first color range.

9. The color image display device as defined in claim 8, wherein the color ranges displayed by the color image display device further include a fourth color range having saturation higher than the second color range, and a color with saturation higher than the saturation determined by the input video signal is displayed with the hue determined by the input video signal in the fourth color range, and the degree of enhancement of the saturation is greater than the degree of enhancement of the saturation in the first color range and is different from the degree of enhancement of the saturation in the second color range.

10. The color image display device as defined in claim 1, wherein the color ranges displayed by the color image display device further include a fourth color range having saturation higher than the second color range, and a color with saturation higher than the saturation determined by the input video signal is displayed with the hue determined by the input video signal in the fourth color range, and the degree of enhancement of the saturation is greater than the degree of enhancement of the saturation in the first color range and is different from the degree of enhancement of the saturation in the second color range.

11. A color conversion device which converts a first color space of an input video signal using at least three primary colors into a second color space of an output video signal suitable for a specific color image display device which reproduces color ranges, the color conversion device comprising:
    a signal converter configured to convert the input video signal into the output video signal, wherein
    the first color space includes
        at least a first color range including white and a plurality of hues, and
        a second color range, distinct from the first color range, having a plurality of hues and saturation for all hues higher than the first color range,
    the color conversion device converts the first color range of the first color space into a first color range of the second color space which includes a color with saturation higher than saturation determined by an input video signal and with a hue to be same as the hue determined by the input video signal in the first color range; and
    the color conversion device converts the second color range of the first color space into a second color range of the second color space which includes a color with a hue different from the hue determined by the input video signal in the second color range.

12. The color conversion device as defined in claim 11, which converts the input video signal in the second color range into the output video signal that displays a color having a closer hue to the hue of a primary color of the color image display device as compared to the hue determined by the input video signal.

13. The color conversion device as defined in claim 12, wherein the color ranges displayed by the color image display device further include a third color range having saturation higher than the second color range, and the color conversion device converts the input video signal into the output video signal which displays a color different from the hue determined by the input video signal in the third color range and more closer to the hue of the primary color of the color image display device as compared to the color displayed in the second color range.

14. The color conversion device as defined in claim 13, wherein a color with saturation higher than the saturation determined by the input video signal is displayed in the second color range, and a degree of enhancement of the saturation is different from a degree of enhancement of the saturation in the first color range.

15. The color conversion device as defined in claim 13, wherein the color ranges displayed by the color image display device further include a fourth color range having saturation higher than the second color range, and a color with saturation higher than the saturation determined by the input video signal is displayed with the hue determined by the input video signal in the fourth color range, and a degree of enhancement of the saturation is greater than the degree of enhancement of the saturation in the first color range and is different from the degree of enhancement of the saturation in the second color range.

16. The color conversion device as defined in claim 12, wherein a color with saturation higher than the saturation determined by the input video signal is displayed in the second color range, and a degree of enhancement of the saturation is different from a degree of enhancement of the saturation in the first color range.

17. The color conversion device as defined in claim 12, wherein the color ranges displayed by the color image display device further include a fourth color range having saturation higher than the second color range, and a color with saturation higher than the saturation determined by the input video signal is displayed with the hue determined by the input video signal in the fourth color range, and a degree of enhancement of the saturation is greater than the degree of enhancement of the saturation in the first color range and is different from the degree of enhancement of the saturation in the second color range.

18. The color conversion device as defined in claim 11, wherein a color with saturation higher than the saturation determined by the input video signal is displayed in the second color range, and a degree of enhancement of the saturation is different from a degree of enhancement of the saturation in the first color range.

19. The color conversion device as defined in claim 18, wherein the color ranges displayed by the color image display device further include a fourth color range having saturation higher than the second color range, and a color with saturation higher than the saturation determined by the input video signal is displayed with the hue determined by the input video signal in the fourth color range, and a degree of enhancement of the saturation is greater than the degree of enhancement of the saturation in the first color range and is different from the degree of enhancement of the saturation in the second color range.

20. The color conversion device as defined in claim 11, wherein the color ranges displayed by the color image display device further include a fourth color range having saturation higher than the second color range, and a color with saturation higher than the saturation determined by the input video signal is displayed with the hue determined by the input video signal in the fourth color range, and a degree of enhancement of the saturation is greater than the degree of enhancement of the saturation in the first color range and is different from the degree of enhancement of the saturation in the second color range.

* * * * *